US012725065B2

(12) United States Patent
Chen et al.

(10) Patent No.: US 12,725,065 B2
(45) Date of Patent: Sep. 1, 2026

(54) METHOD AND APPARATUS FOR FABRICATING QUANTUM CIRCUIT, DEVICE, MEDIUM, AND PRODUCT

(71) Applicant: Tencent Technology (Shenzhen) Company Limited, Shenzhen (CN)

(72) Inventors: Yuqin Chen, Shenzhen (CN); Shengyu Zhang, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 742 days.

(21) Appl. No.: 18/202,209

(22) Filed: May 25, 2023

(65) Prior Publication Data

US 2024/0005192 A1 Jan. 4, 2024

Related U.S. Application Data

(63) Continuation of application No. PCT/CN2022/136344, filed on Dec. 2, 2022.

(30) Foreign Application Priority Data

Jan. 20, 2022 (CN) ......................... 202210066132.9

(51) Int. Cl.
*G06N 10/20* (2022.01)

(52) U.S. Cl.
CPC .................................... *G06N 10/20* (2022.01)

(58) Field of Classification Search
USPC .......................................................... 716/108
See application file for complete search history.

(56) References Cited

U.S. PATENT DOCUMENTS

2021/0011748 A1 1/2021 Lee et al.
2023/0016119 A1* 1/2023 Wei ........................ G06N 10/60

FOREIGN PATENT DOCUMENTS

CN 113807525 A 12/2021
CN 113935491 A 1/2022
JP 2020201566 A 12/2020

(Continued)

OTHER PUBLICATIONS

Tencent Technology, WO, PCT/CN2022/136344, Feb. 13, 2023, 3 pgs.

(Continued)

*Primary Examiner* — Mohammed Alam
(74) *Attorney, Agent, or Firm* — Morgan, Lewis & Bockius LLP

(57) ABSTRACT

Disclosed are a method for obtaining a quantum circuit performed by a computer device, relating to the field of quantum technologies. The method includes: obtaining a combination of identity matrices and Pauli Z matrices as a diagonal matrix basis; determining a dynamical evolution relationship of imaginary time diagonal control based on the diagonal matrix basis and a dynamical evolution relationship of quantum imaginary time control; determining a first quantum circuit of imaginary time diagonal control based on the dynamical evolution relationship of imaginary time diagonal control; determining a second quantum circuit based on a variational quantum approximation algorithm; and cyclically alternating the first quantum circuit and the second quantum circuit to obtain a quantum circuit.

20 Claims, 16 Drawing Sheets

(56) References Cited

FOREIGN PATENT DOCUMENTS

WO WO 2020095051 A2 5/2020
WO WO-2022217854 A1 * 10/2022 ............. G06N 10/20

OTHER PUBLICATIONS

Tencent Technology, IPRP, PCT/CN2022/136344, Jul. 23, 2024, 4 pgs.
Tencent Technology, Japanese Office Action, JP Patent Application No. 2023-551962, Sep. 2, 2024, 5 pgs.
Tencent Technology, ISR, PCT/CN2022/136344, Feb. 13, 2023, 2 pgs.

* cited by examiner

METHOD AND APPARATUS FOR FABRICATING QUANTUM CIRCUIT, DEVICE, MEDIUM, AND PRODUCT

CROSS-REFERENCE TO RELATED APPLICATIONS

This application is a continuation application of PCT Patent Application No. PCT/CN2022/136344, entitled "METHOD AND APPARATUS FOR FABRICATING QUANTUM CIRCUIT, DEVICE, MEDIUM, AND PRODUCT" filed on Dec. 2, 2022, which claims priority to China Patent Application No. 202210066132.9, filed on Jan. 20, 2022 and entitled "METHOD AND APPARATUS FOR FABRICATING QUANTUM CIRCUIT, DEVICE, MEDIUM, AND PRODUCT", all of which are incorporated herein by reference in their entirety.

FIELD OF THE TECHNOLOGY

Embodiments of this application relate to the field of quantum technologies, and in particular, to a method and apparatus for fabricating a quantum circuit, a device, a medium, and a product.

BACKGROUND OF THE DISCLOSURE

With the rapid development of quantum computation, quantum algorithms have important applications in many fields. In a related technology, a quantum circuit fabricated based on quantum imaginary time evolution is provided, in which a unitary approximation circuit is fabricated according to a quantum imaginary time evolution unitary approximation method.

However, in the foregoing manner, the quantum imaginary time evolution unitary approximation method needs a good enough unitary basis to ensure precision after evolution mapping, and also needs to solve linear equations in each step. When the linear equations are constructed, unitary parameters need to be expanded and approximated through a unitary approximation method. Even if only second-order approximation is done, the quantum imaginary time evolution unitary approximation method still needs to measure multiple observations to observe evolution results of the quantum circuit. With size increase of systems and requirements for precision, measured data of some observations increase sharply with the evolution. Therefore, in large systems, this method gradually loses its feasibility due to large measured quantities and difficulties in solving. In addition, a depth of the circuit (namely, a longest path in the quantum circuit, where a path length is an integer representing a quantity of gates executed in the path during circuit measurement) constructed by this method also increases as evolution duration increases.

SUMMARY

Embodiments of this application provide a method and apparatus for fabricating a quantum circuit, a device, a medium, and a product, which can accelerate a process of quantum imaginary time evolution. Technical solutions are as follows:

According to one aspect of this application, a method for fabricating a quantum circuit is performed by a computer device. The method includes:

obtaining a combination of identity matrices and Pauli Z matrices as a diagonal matrix basis;

determining a dynamical evolution relationship of imaginary time diagonal control based on a dynamical evolution relationship of quantum imaginary time control and the diagonal matrix basis;

determining a first quantum circuit of imaginary time diagonal control based on the dynamical evolution relationship of imaginary time diagonal control;

determining a second quantum circuit based on a variational quantum approximation algorithm; and using a cyclic alternating circuit of the first quantum circuit and the second quantum circuit as a fabricated quantum circuit.

According to another aspect of the embodiments of this application, a computer device is provided, the computer device including a processor and a memory, the memory storing at least one instruction, and the at least one instruction, when executed by the processor, causing the computer device to implement the foregoing method for fabricating a quantum circuit.

According to another aspect of the embodiments of this application, a non-transitory computer-readable storage medium stores at least one instruction, the at least one program, when executed by a processor of a computer device, causing the computer device to implement the foregoing method for fabricating a quantum circuit.

The technical solutions provided in the embodiments of this application may bring the following beneficial effects:

Through a quantum diagonal control method suitable for a quantum imaginary time evolution process, a measured quantity is reduced and quantum imaginary time evolution is accelerated. A circuit structure of alternating cycles of a variational circuit and a diagonal control circuit has a shorter circuit architecture to implement the same evolution, and also reduces a quantity of parameters required by a variational circuit and measurement requirements. The circuit structure of alternating cycles of the variational circuit and the diagonal control circuit uses original imaginary time evolution to match a diagonal control method, and uses fewer diagonal control terms to replace the original imaginary time evolution in its controllable interval to implement circuit fabrication of reducing the measured quantity. Under Pauli Z measurements, the matrix $H_d$ composed of an identity matrix and a Pauli Z matrix and the terms $H_dH_p$ and $H_d\sigma_\mu$ acting on the matrix reduce the measured quantity a little compared with $H_d\sigma_\mu$ and $\sigma_\mu$ in a quantum imaginary time unitary approximation method, so the main contribution of the measured quantity is determined by $\sigma_\mu\sigma_\mu$, $H_p$, and $\sigma_\mu$, thereby reducing the quantity of parameters and the number of measurements required by the variational circuit.

DESCRIPTION OF EMBODIMENTS

Figure 1:
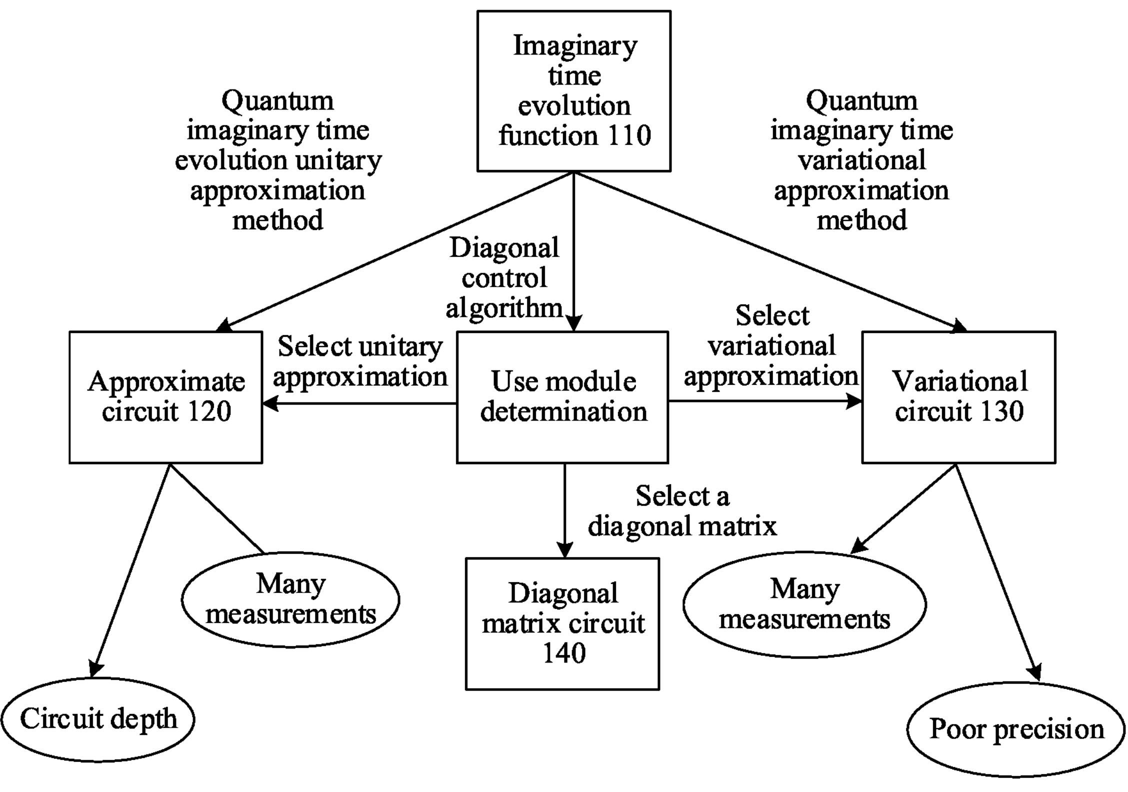
FIG. 1 is a schematic diagram of a circuit fabrication architecture according to an exemplary embodiment of this application.

Before the embodiments of this application are described, some terms related to this application are first described.

1. Quantum computation: A computation method based on quantum logic, a basic unit for storing data being qubit.
2. Qubit: A basic unit of quantum computation. Conventional computers use 0 and 1 as basic binary units, while the quantum computation may handle both 0 and 1 simultaneously, and a system may be in a linear superposition state of 0 and 1: $|\psi\rangle=\alpha|0\rangle+\beta|1\rangle$, where $\alpha$ and $\beta$ represent complex probability amplitudes of the system on 0 and 1. Their modulus squares $|\alpha|^2$ and $|\beta|^2$ represent probabilities at 0 and 1, respectively.
3. Hamiltonian: A Hermitian conjugate matrix describing total energy of a quantum system. Hamiltonian is a physical term and an operator that describes the total energy of the system, and is generally represented by H.
4. Quantum state: In quantum mechanics, the quantum state is a microscopic state determined by a group of quantum numbers.
5. Eigenstate: In quantum mechanics, possible numerical values of a mechanical quantity are all eigenvalues of its operator. A state described by an eigenfunction is called an eigenstate of this operator. In the eigenstate, the mechanical quantity is a definite value, which is an eigenvalue of the eigenstate. A Hamiltonian matrix H satisfies an equation: $H|\psi\rangle+E|\psi\rangle$. A solution of the equation is called an eigenstate $|\psi\rangle$ of H, which has eigen-energy E. A ground state corresponds to a minimum energy eigenstate of the quantum system.
6. Quantum circuit: A representation of a quantum general-purpose computer, representing a hardware implementation of a corresponding quantum algorithm/program under a quantum gate model. If the quantum circuit contains adjustable parameters that control a quantum gate, the quantum circuit is called a parameterized quantum circuit (PQC) or a variational quantum circuit (VQC), both of which are the same concept.
7. Quantum gate: In quantum computation, especially in a computing model of a quantum circuit, a quantum gate (or quantum logic gate) is a basic quantum circuit that operates a small quantity of qubits.
8. Variational quantum eigensolver (VQE): It estimates ground state energy of a specific quantum system through a variational circuit (PQC/VQC), is a classical quantum hybrid computing paradigm, and has been widely used in the field of quantum chemistry.
9. Non-unitary: A unitary matrix refers to all matrices that satisfy $U^\dagger U=I$, and all evolution processes directly allowed by quantum mechanics may be described by the unitary matrix. U is a unitary matrix, and $U^\dagger$ is a conjugate transposition of U. In addition, matrices that do not satisfy this condition are non-unitary and may be implemented experimentally through auxiliary means or even exponential resources, but the non-unitary matrices often have stronger expression abilities and faster ground state projection effects. The "exponential resources" indicate that a demand for resources increases exponentially with the increase of qubits. The exponential resources may indicate that a total number of quantum circuits to be measured is exponential, that is, corresponding exponential computation time is needed.
10. Pauli operator: Also known as a Pauli matrix, it is a group of three 2><2 unitary Hermitian complex matrix (also known as a unitary matrix), generally represented by the Greek alphabet $\sigma$ (Sigma). A Pauli X operator is $$\sigma_x=\begin{bmatrix}0&1\\1&0\end{bmatrix},$$

a Pauli Y operator is $$\sigma_y=\begin{bmatrix}0&-i\\i&0\end{bmatrix},$$

and a Pauli Z operator is $$\sigma_z=\begin{bmatrix}1&0\\0&-1\end{bmatrix}.$$

11. Quantum imaginary time evolution process: The process replaces a real time expression with an imaginary time expression to evolve a quantum dynamics evolution equation, and is mainly used to find a minimum eigenstate.
12. Quantum diagonal control: Control a quantum state evolution process by adding an adjustable group of diagonal Hamiltonian operators, and reduce observations by using the properties of a diagonal matrix.
13. Fabrication of a time-dependent non-unitary approximate unitary transformation circuit: Time-dependent non-unitary evolution is mapped to time-dependent unitary evolution through an approximation method to fabricate a circuit on which a circuit architecture of a current quantum computer may be placed.

Obtaining a ground state of a quantum system represents obtaining a most stable state of the quantum system, and has very important applications in scenarios such as research of basic properties of quantum physics and quantum chemistry systems, solving of combinatorial optimization problems, and pharmaceutical research. An important application scenario of the quantum computer is to effectively solve or express the ground state of the quantum system. Imaginary time evolution is a basic method for solving the ground state of the quantum system.

A time-dependent Schrodinger equation is:

$$i\hbar\frac{d|\psi(t)\rangle}{dt} = H|\psi(t)\rangle$$

where H is a Hamiltonian of a target quantum system, $\psi(t)$ represents a quantum state of the target quantum system at time t, and i and $\hbar$ are imaginary time units.

The real time tin the time-dependent Schrodinger equation is replaced with an imaginary time $$\tau = \frac{i}{\hbar}t,$$

and the following imaginary time Schrodinger equation is obtained by rewriting:

$$\frac{d|\psi(\tau)\rangle}{d\tau} = -H|\psi(\tau)\rangle$$

In this case, a solution of the imaginary time Schrodinger equation is:

$$|\psi(\tau)\rangle = e^{-H\tau}|\psi(0)\rangle$$

Because $e^{-H\tau}$ is a non-unitary operator, it needs to be normalized:

$$\frac{d|\psi(\tau)\rangle}{d\tau} = -(H - E_\tau)|\psi(\tau)\rangle$$

$$|\psi(\tau)\rangle = A(\tau)e^{-H\tau}|\psi(0)\rangle$$

$$A(\tau) = \frac{1}{\sqrt{\langle\psi(0)|e^{-2H\tau}|\psi(0)\rangle}}$$

where $E_\tau$ represents an eigenvalue at time $\tau$.

A wave function in the imaginary time Schrodinger equation is expressed by expanding eigenvectors:

$$|\psi(\tau)\rangle = \sum_i c_i|\psi_i(\tau)\rangle = \sum_i e^{-\tau E_i}c_i|\psi_i(0)\rangle$$

where $E_i$ is eigen-energy, $E_0<E_i$, $E_0$ is ground state energy, and $c_i$ is an expansion coefficient.

Because $E_0<E_i$, when the time approaches infinity, other eigenstates disappear exponentially, that is, as $\psi(\tau)$ evolves, other states decay faster, and only the ground state is left:

$$\lim_{\tau\to\infty}\frac{\langle\psi(\tau)\,|\,c_0\psi_0(\tau)\rangle}{\langle\psi(\tau)1\psi(\tau)\rangle} = \lim_{\tau\to\infty}\frac{c_0^2e^{-2\tau E_0}}{c_0^2e^{-2\tau E_0} + \sum_{i=1}^{\infty}c_i^2e^{-2\tau E_i}} = 1$$

Therefore, given any wave function, as long as an overlapping quantity co of the wave function and the minimum eigenstate is not 0, the following wave function may be obtained at time T:

$$\psi(\tau) = c_0e^{-\tau H}\psi_0(0) + 0\left(e^{-\tau(E_i-E_0)}\right)$$

An initial minimum eigenstate may be inferred thereby:

$$\psi_0(0) = \lim_{\tau\to\infty}\frac{\psi(\tau)}{\langle\psi(\tau)\,|\,\psi(\tau)\rangle}$$

It may be seen from the above that the quantum imaginary time evolution is a powerful tool for finding a ground state of a quantum system at present, and has many feasible solutions on quantum computers. The following describes a quantum imaginary time evolution unitary approximation method and a quantum imaginary time evolution variational approximation method as examples:

(1) Quantum Imaginary Time Evolution Unitary Approximation Method

In order to implement non-unitary evolution imaginary time dynamics on a quantum computer, one of intuitive ways is to find a group of unitary operators that act on a current quantum state and ensure that the acting state is similar to an acting result of a non-unitary evolution operator of imaginary time. Therefore, in this solution, an approximate fabricating method is provided. First, a group of unitary operators needs to be selected as bases, and then a group of non-unitary operators is linearly combined from the pre-selected bases by using an approximation method to approximate its evolution, so as to realize its transformation to a quantum circuit.

(2) Quantum Imaginary Time Evolution Variational Approximation Method

Compared with the foregoing approximation method that constructs and solves a linear system from the pre-selected bases, the core idea of the quantum imaginary time evolution variational approximation method is also to find a group of unitary operators to approximate non-unitary evolution. The difference is that this method designs a circuit architecture in advance, then transforms a time evolution problem to evolution of parameters on a parametric circuit, and transforms a long-circuit problem into a short-circuit parameter problem.

However, the foregoing quantum imaginary time evolution unitary approximation method needs to select enough good unitary bases to ensure precision after evolution mapping, and also needs to solve additional linear groups in each step. When the linear equations are constructed, even if only $e^{-\Delta\tau H[l]}$ is expanded for second-order approximation, five observations $\sigma_\mu\sigma_\nu$, $H[l]\sigma_\mu$, $H[l]^2\sigma_\mu$, $H[l]$, and $H[l]^2$ still need to be measured. With size increase of systems and requirements for precision, $\sigma_\mu$ and $H[l]$ increase rapidly. Therefore, in large systems, this method will gradually lose its feasibility in face of large measured quantities and difficulties in solving large matrices. In addition, the depth of the circuit constructed by this method also increases with evolution duration.

The foregoing quantum imaginary time evolution variational approximation method involves a preset fixed circuit structure, but the fixed circuit structure often faces trade-offs among precision, parameter quantity, and length. The trade-offs in circuit design also cause convergence precision of this method to be greatly affected by the selected circuit architecture, which is difficult to estimate in advance. In addition to the impact on precision, if more parameters are selected to meet the precision requirements, approximating the matrices that need to be solved also increases the measured quantity. Especially in terms of measurement of the $$A_{ij} = \frac{\langle\partial\phi(\tau)|}{\partial\theta_i}\frac{|\partial\phi(\tau)\rangle}{\partial\theta_j}$$

circuit, the measured quantity increases based on the quantity of parameters. Moreover, the difficulties in solving linear equations gradually increase as the system becomes larger and more complex and the Pauli matrices exist. On the whole, the adaptability to large systems is determined by the design of variational circuits to a great extent, and there is currently no design concept for universal variational circuits.

In the embodiments of this application, a diagonal matrix basis that is relatively simple in measurement and is composed of an identity matrix and a Pauli Z matrix is studied, a group of evolution operators is generated from the basis by quantum imaginary time control, and the properties of a diagonal matrix and quantum control are used to achieve effects of reducing a measured quantity and reducing a circuit depth compared with the current algorithm.

For example, refer to FIG. 1, which illustrates a schematic diagram of a circuit fabrication architecture according to an exemplary embodiment of this application. As shown in FIG. 1, based on an imaginary time evolution function 110, an approximate circuit 120 can be obtained through a quantum imaginary time evolution unitary approximation method, resulting in many quantum circuit measurements and deep circuits; a variational circuit 130 can be obtained through a quantum imaginary time variational approximation method, resulting in many quantum circuit measurements and poor precision; and in this embodiment, a diagonal matrix circuit 140 is obtained through a diagonal control algorithm and module determination and by using a diagonal module.

Before the method embodiment of this application is described, an execution environment for the method of this application is first explained.

A method for fabricating a quantum circuit according to the embodiment of this application may be implemented by a classical computer (such as a PC), for example, the classical computer executes a corresponding computer program to implement the method. The method may alternatively be implemented in a hybrid device environment of a classical computer and a quantum computer, for example, the classical computer and the quantum computer cooperate to implement the method. For example, the quantum computer is used to solve an eigenstate in the embodiment of this application, and the classical computer is used to implement other steps in the embodiment of this application except the eigenstate solution problem.

In the following method embodiment, for ease of description, an example in which a computer device is used as an executive subject of all steps is used for description. It is to be understood that the computer device may be a classical computer, or may be a hybrid execution environment including a classical computer and a quantum computer, which is not limited by the embodiment of this application.

Figure 2:
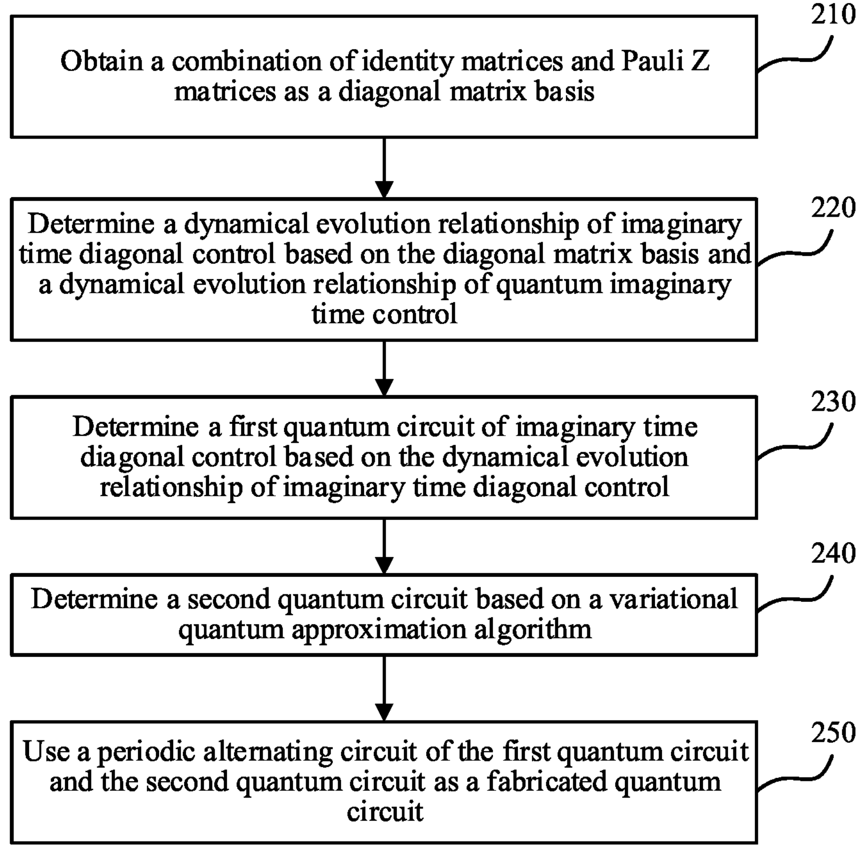
FIG. 2 is a flowchart of a method for fabricating a quantum circuit according to an embodiment of this application.

Refer to FIG. 2, which illustrates a flowchart of a method for fabricating a quantum circuit according to an embodiment of this application. The executive subject of all the steps of the method may be a computer device. The method may include the following steps:

Step 210: Obtain a combination of identity matrices and Pauli Z matrices as a diagonal matrix basis.

That is, a group of diagonal matrices composed of identity matrices and Pauli Z matrices is obtained as the diagonal matrix basis.

Step 220: Determine a dynamical evolution relationship of imaginary time diagonal control based on the diagonal matrix basis and a dynamical evolution relationship of quantum imaginary time control.

For example, a special quantum dynamics evolution relationship is provided under an expression of imaginary time dynamics, and the idea of quantum control theory is used to regulate its evolution. The dynamical evolution relationship of imaginary time diagonal control is shown as follows:

$$\frac{d|\psi(\tau)\rangle}{d\tau} = -(\beta_d(\tau)H_d - E)|\psi(\tau)\rangle$$

where $\tau$ represents imaginary time, $|\psi(\tau)\rangle$ represents an imaginary time eigenstate, $H_d$ is a group of diagonal matrices composed of identity matrices and Pauli Z matrices, namely, an evolution operator determined based on the diagonal matrix basis, $\beta_d(\tau)$ represents a real coefficient that changes with time, E represents eigen-energy, and $E=\langle\psi(\tau)|\beta_d(\tau)H_d|\psi(\tau)\rangle$. It needs to design $\beta_d(\tau)$ to control evolution of the system towards a $H_p$ minimum eigenstate.

In some embodiments, the real coefficient is determined based on a first-order partial derivative of time required by a Lyapunov function, that is, the Lyapunov function may provide us with the idea of $\beta_d(\tau)$ function design.

Start from the Lyapunov function based on an average value:

$$V(\psi(\tau)) = \langle\psi(\tau)|(H_p - E_0)|\psi(\tau)\rangle$$

where $E_0$ is an $H_p$ minimum eigenvalue, $H_p$ represents an original Hamiltonian operator, that is, $E_0$ is any numerical value, so that $H_p - E_0$ is a positive semi-definite matrix. Through the Lyapunov function on the first-order partial derivative of time, the following may be obtained:

$$\dot{V}(\psi(\tau)) = -\langle\dot{\psi}(\tau)\,|\,(H_p - E_0)\beta_d(\tau)(H_d - E)\,|\,\psi(\tau)\rangle - \langle\psi(\tau)\,|\,\beta_d(\tau)(H_d - E)(H_p - E_0)\rangle\,|\,\dot{\psi}(\tau)\rangle\,| = -\beta_d(\tau)(\langle\psi(\tau)\,|\,[H_d, H_p]\,|\,\psi(\tau)\rangle - 2\langle H_d\rangle\langle H_p\rangle) \le 0$$

Because $\beta_d(\tau)$ needs to ensure the establishment of $\dot{V}(\psi(\tau))\le 0$, $\forall\tau<0$, in some embodiments, $\beta_d(\tau)$ is as follows:

$$\beta_d(\tau) = (\langle\psi(\tau)\|\{H_d, H_p\}\|\psi(\tau)\rangle - 2\langle H_d\rangle\langle H_p\rangle)$$

Therefore, $\beta_d(0)=0$, and $\dot{V}(\psi(\tau))\le 0$, $\forall\tau>0$.

Step 230: Determine a first quantum circuit of imaginary time diagonal control based on the dynamical evolution relationship of imaginary time diagonal control.

In some embodiments, unitary transformation is performed on the dynamical evolution relationship of imaginary time diagonal control through a quantum imaginary time evolution unitary approximation method to obtain the quantum circuit of imaginary time diagonal control.

Step 240: Determine a second quantum circuit based on a variational quantum approximation algorithm.

In some embodiments, the second quantum circuit is determined through a quantum imaginary time evolution variational approximation algorithm.

It needs to be noted that steps 220, 230, and 240 are parallel steps, steps 220 and 230 may be first performed, or step 240 may be first performed, or steps 220, 230, and 240 are performed at the same time.

Step 250: Use a cyclic alternating circuit of the first quantum circuit and the second quantum circuit as a fabricated quantum circuit.

In some embodiments, the alternating circuit of the first quantum circuit and the second quantum circuit with preset imaginary time steps as a cycle is used as the fabricated quantum circuit.

The quantum circuit of imaginary time diagonal control has certain limitations: i. convergence is affected when the eigenstate of $H_d$ is an equilibrium state; ii. the initial state has to be uniformly distributed, indicating that all positions on its vector have numerical values and can be evolved to all position in a space through simple diagonal matrix evolution; and iii. in order to combine all diagonal matrices, a combination of all identity matrices and Pauli Z matrices needs to be used, and this combination has a total of $2^n$ terms. Therefore, in computation of large systems, even if many measurements are not required, there is still a computing requirement for post-processing transformation on the classical computer, which still brings a considerable burden to the overall convergence.

Therefore, in the embodiment of this application, an alternating structure of original imaginary time evolution combined with a diagonal control method is used, and fewer diagonal control terms are used to replace original imaginary time evolution in its controllable range to implement circuit fabrication that reduces the measured quantity. In addition, it has been found through experiments that better precision can be achieved with fewer evolutions by means of the advantages of imaginary time control. If blocks of imaginary time evolution are constructed by using the variational quantum approximation algorithm, simpler circuit structures, such as fewer parameters and lower circuit depth can be used compared with the original single variational quantum unitary approximation algorithm that need fewer evolved states.

Figure 3:
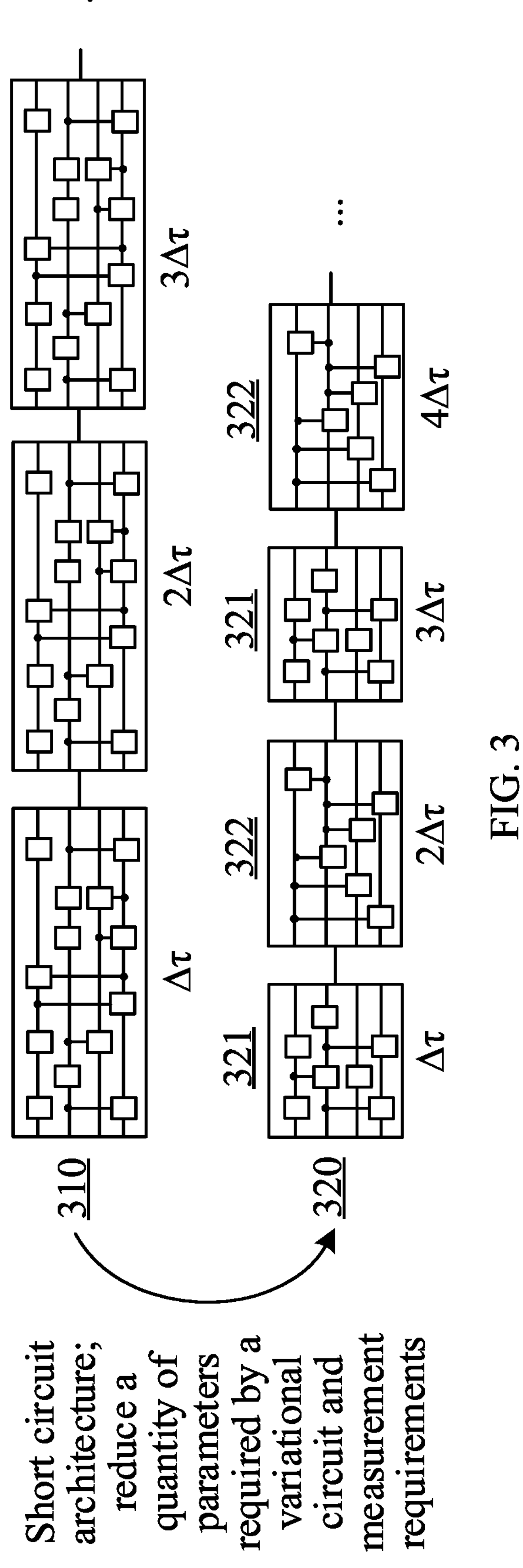
FIG. 3 is a schematic diagram of an alternating structural circuit according to an exemplary embodiment of this application.

For example, refer to FIG. 3, which illustrates a schematic diagram of an alternating structural circuit according to an exemplary embodiment of this application. As shown in FIG. 3, the circuit 310 is an evolved circuit constructed by a quantum unitary approximation algorithm. The circuit 320 is an alternating cyclic circuit structure composed of a variational circuit 321 and a diagonal control circuit 322. In alternation, the variational circuit 321 and the diagonal control circuit 322 correspond to a preset imaginary time step $\Delta\tau$ each time. Obviously, on the basis of the same imaginary time step $\Delta\tau$, in each imaginary time step $\Delta\tau$, the circuit 310 and the circuit 320 shown in FIG. 3 are shorter in quantum gate distribution and have fewer quantum gates than the circuit 310, that is, the circuit 320 uses a shorter circuit architecture to achieve the same evolution, and also reduces a quantity of parameters required by a variational circuit and measurement requirements.

To sum up, in the method provided in this embodiment, the quantum diagonal control method suitable for a quantum imaginary time evolution process is used to reduce the measured quantity and accelerate the quantum imaginary time evolution, and the circuit structure of alternating cycles of the variational circuit and the diagonal control circuit achieves the same evolution with a shorter circuit architecture compared with an evolved circuit constructed by a quantum unitary approximation algorithm. In addition, the quantum unitary approximation algorithm needs to find a group of unitary operators to act on the quantum state, and the acting state is to be similar to an acting result of a non-unitary evolution operator of imaginary time, so a group of unitary operators is pre-selected as bases, and a group of unitary operators is linearly combined from the pre-selected bases by using an approximation method to approximate its evolution. However, the selection of unitary operators is a random selection that cannot predict the effect. Therefore, after the unitary bases are selected, when the combined performance of the unitary bases is weak, the precision after evolutionary mapping will be affected. Moreover, the quantum unitary approximation algorithm also needs to solve additional linear equations in each step. When the linear equations are constructed, even if only $e^{-\Delta\tau H[l]}$ is expanded for second-order approximation, five observations $\alpha_\mu\sigma_\nu$, $H[l]\alpha_\mu$, $H[l]^2\,\sigma_\mu$, $H[l]$, and $H[l]^2$ still need to be measured. With size increase of systems and requirements for precision, $\sigma_\mu$ and $H[l]$ increase rapidly. Therefore, in large systems, large measured quantities and difficulties in solving large matrices will be faced. In this embodiment, the circuit structure of alternating cycles of the variational circuit and the diagonal control circuit uses original imaginary time evolution to match a diagonal control method, and uses fewer diagonal control terms to replace the original imaginary time evolution in its controllable interval to implement circuit fabrication of reducing the measured quantity. Under Pauli Z measurements, the matrix $H_d$ composed of an identity matrix and a Pauli Z matrix and the terms $H_dH_p$ and $H_d\,\sigma_\mu$ acting on the matrix reduce the measured quantity a little compared with original $H_d\,\sigma_\mu$ and $\sigma_\mu$. Therefore, in the embodiment of this application, the main contribution of the measured quantity is determined by $\sigma_\mu\sigma_\nu$, $H_p$, and $\sigma_\mu$, thereby reducing the quantity of parameters required by the variational circuit and measurement requirements.

In an exemplary embodiment, the first quantum circuit is obtained by unitary transformation on the dynamical evolution relationship of imaginary time diagonal control. FIG.

Figure 4:
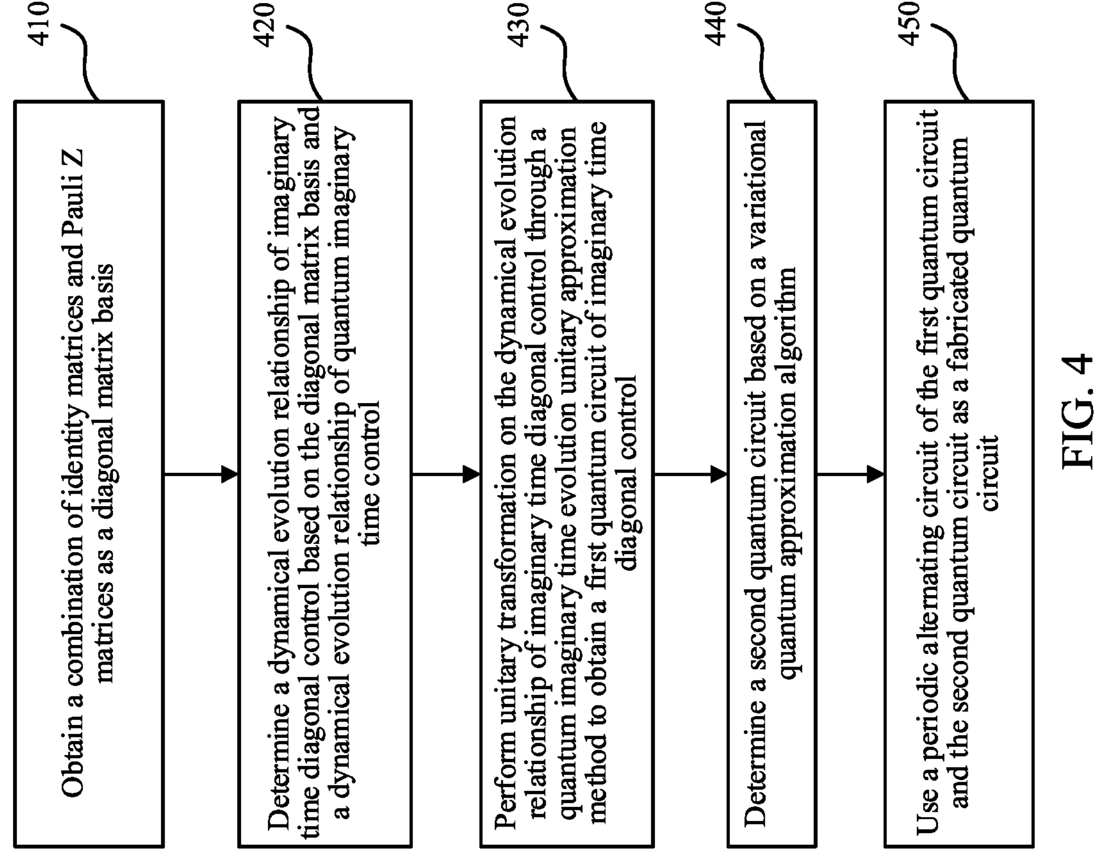
FIG. 4 is a flowchart of a method for fabricating a quantum circuit according to another embodiment of this application.

4 is a flowchart of a method for fabricating a quantum circuit according to another embodiment of this application. As shown in FIG. 4, the method includes the following steps:

Step 410: Obtain a combination of identity matrices and Pauli Z matrices as a diagonal matrix basis.

That is, a group of diagonal matrices composed of the identity matrix and the Pauli Z matrix is obtained as the diagonal matrix basis.

Step 420: Determine a dynamical evolution relationship of imaginary time diagonal control based on the diagonal matrix basis and a dynamical evolution relationship of quantum imaginary time control.

For example, a special quantum dynamics evolution relationship is provided under an expression of imaginary time dynamics, and the idea of quantum control theory is used to regulate its evolution. The dynamical evolution relationship of imaginary time diagonal control is shown as follows:

$$\frac{d\,|\psi(\tau)\rangle}{d\tau} = -(\beta_d(\tau)H_d - E)\,|\psi(\tau)\rangle$$

where $\tau$ represents imaginary time, $|\psi(\tau)\rangle$ represents an imaginary time eigenstate, $H_d$ is a group of diagonal matrices composed of identity matrices and Pauli Z matrices, namely, an evolution operator determined based on the diagonal matrix basis, $\beta_d(\tau)$ represents a real coefficient that changes with time, E represents eigen-energy, and $E=\langle \psi(\tau)|\beta_d(\tau)H_d|\psi(\tau)\rangle$. It needs to design fid $\beta_d(\tau)$ to control evolution of the system towards a $H_p$ minimum eigenstate.

Step 430: Perform unitary transformation on the dynamical evolution relationship of imaginary time diagonal control through a quantum imaginary time evolution unitary approximation method to obtain a first quantum circuit of imaginary time diagonal control In some embodiments, the dynamical evolution relationship of imaginary time diagonal control is transformed into a candidate quantum circuit; and unitary transformation is performed on the candidate quantum circuit through the quantum imaginary time evolution unitary approximation method to obtain the first quantum circuit of imaginary time diagonal control.

Figure 5:
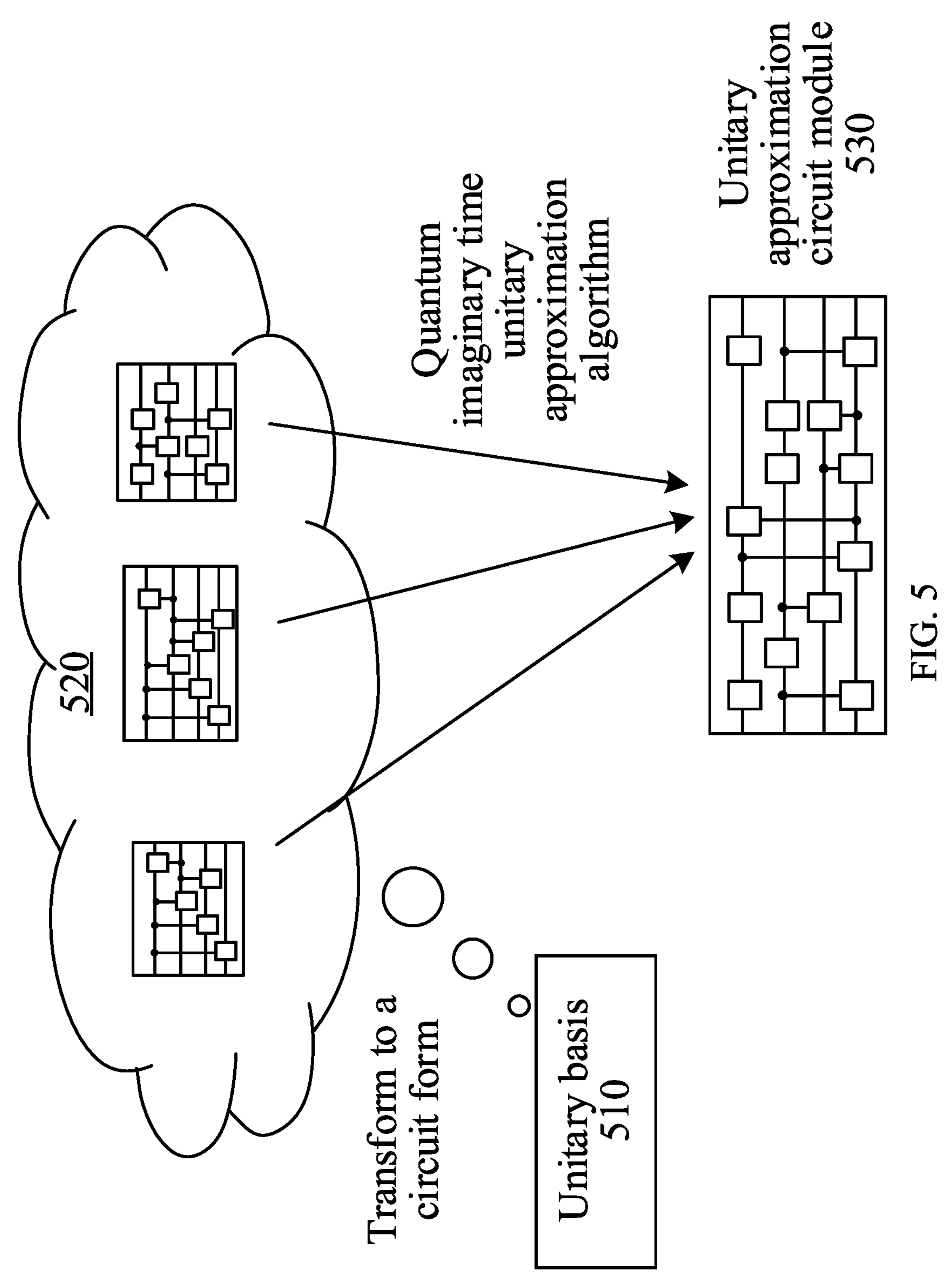
FIG. 5 is a schematic diagram of an obtaining process of a first quantum circuit according to an exemplary embodiment of this application.

For example, refer to FIG. 5, which illustrates a schematic diagram of an obtaining process of a first quantum circuit according to an exemplary embodiment of this application. As shown in FIG. 5, a unitary basis 510 is first pre-selected and transformed to a circuit form 520, and the circuit structure is transformed through a quantum imaginary time unitary approximation algorithm to obtain a unitary approximation circuit module 530.

That is, unitary transformation is performed on the dynamical evolution relationship of imaginary time diagonal control through the quantum imaginary time evolution unitary approximation method, as shown in the following formula:

$$A[l]x[l] = b[l]$$

$$A[l]_{\mu\nu} = \Re(\langle\psi\,|\,\sigma_\mu\sigma_\nu\,|\,\psi\rangle)$$

$$b[l]_\mu = \frac{\Im(\langle\psi\,|\,e^{-\Delta\tau\beta_d(\tau)H_d}\sigma_\mu\,|\,\psi\rangle)}{\Delta\tau c[l]^{\frac{1}{2}}}$$

where $\{\sigma_\mu\}$ is a pre-selected basis, $x[l]_\mu$ is a coefficient corresponding to linear combination expansion of the pre-selected basis, c[l] is a normalization coefficient, and the goal is to find a numerical value of $x[l]_\mu$ by solving the linear equation. First, second-order approximation of $e^{-\Delta\tau\beta_d(\tau)H_d}$ is determined as a Taylor's formula and expanded to a second-order term:

$$e^{-\Delta\tau\beta_d(\tau)H_d} = I - \Delta\tau\beta_d(\tau)H_d + (\Delta\tau\beta_d(\tau)H_d)^2 + O(\Delta\tau^3)$$

Because each $H_d$ is simply a matrix $$H_d^2 = I$$

composed of an identity matrix and a Pauli Z matrix, the foregoing formula may be written as:

$$e^{-\Delta\tau\beta_d(\tau)H_d} = \left(1 + \Delta\tau^2\beta_d^2(\tau)\right)I - \Delta\tau\beta_d(\tau)H_d$$

In addition, $$c[l]^{\frac{1}{2}}$$

is a positive value, and for the $e^{-\Delta\beta_d(\tau)H_d}$ evolution term based on control theory, the conclusion that the $$c[l]^{\frac{1}{2}}$$

term will not affect the $\dot{V}(\psi(\tau))\le 0$ term is not considered, so $b[l]_\mu$ may be ignored and rewritten as:

$$b[l]_\mu = \frac{\Im\left(\left(1 + \Delta\tau^2\beta_d^2(\tau)\right)\langle\psi|\sigma_\mu|\psi\rangle + \langle\psi|-\Delta\tau\beta_d(\tau)H_d\sigma_\mu|\psi\rangle\right)}{\Delta\tau} + O(\Delta\tau^2)$$

Figure 6:
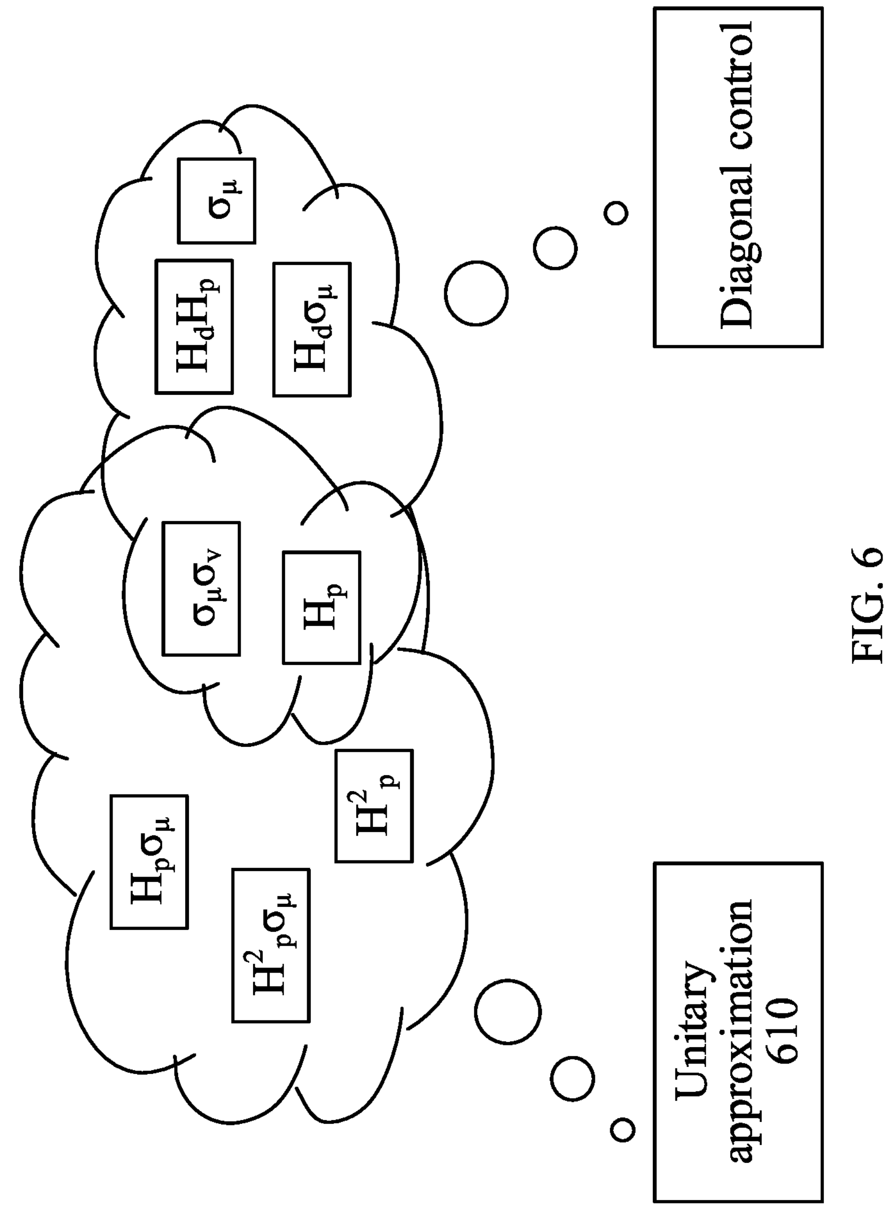
FIG. 6 is a schematic diagram of observation changes according to an embodiment of this application.

As shown in FIG. 6, the measurement changes from the five observations $\sigma_\mu\sigma_\nu$, $H_p\sigma_\mu$, $$H_p^2\sigma_\mu,$$

$H_p$, and $$H_p^2$$

corresponding to original unitary approximation 610 to $\sigma_\mu\sigma_\nu$, $H_d\sigma_\mu$, and $\sigma_\mu$ (for unitary approximation) and $H_p$, $H_d$, and $H_dH_p$ (for control), where under the Pauli Z measurement, the matrix $H_d$ combined from identity matrices and Pauli Z matrices and the $H_dH_p$ and $H_d\sigma_\mu$ items acting on the matrix increase a measured quantity a little compared with original $H_d\sigma_\mu$ and $\sigma_\mu$. Therefore, in the embodiment of the application, the main contribution of the measured quantity is merely determined by $\sigma_\mu\sigma_\nu$, $H_p$, and $\sigma_\mu$. The five items become the main three terms for measurement, where the three terms $H_d\sigma_\mu$, $$H_p^2\sigma_\mu, \text{ and } H_p^2$$

that needs more observations are reduced, while the items $H_dH_p$, $H_d\sigma_\mu$, and $\sigma_\mu$ that need fewer observations are added.

Step 440: Determine a second quantum circuit based on a variational quantum approximation algorithm.

In some embodiments, the second quantum circuit is determined through a quantum imaginary time evolution variational approximation algorithm.

That is, after the circuit architecture is designed in advance, a group of unitary operators are determined for approximate non-unitary evolution, and then the time evolution problem is transformed into parameter evolution on a parametric circuit to obtain the second quantum circuit.

Step 450: Use a cyclic alternating circuit of the first quantum circuit and the second quantum circuit as a fabricated quantum circuit.

In some embodiments, the alternating circuit of the first quantum circuit and the second quantum circuit with preset imaginary time steps as a cycle is used as the fabricated quantum circuit.

In summary, in the method provided in this embodiment, a quantum diagonal control method suitable for a quantum imaginary time evolution process is used to reduce a measured quantity and accelerate quantum imaginary time evolution. A circuit structure of alternating cycles of a variational circuit and a diagonal control circuit has a shorter circuit architecture to implement the same evolution, and also reduces a quantity of parameters required by a variational circuit and measurement requirements.

Figure 7:
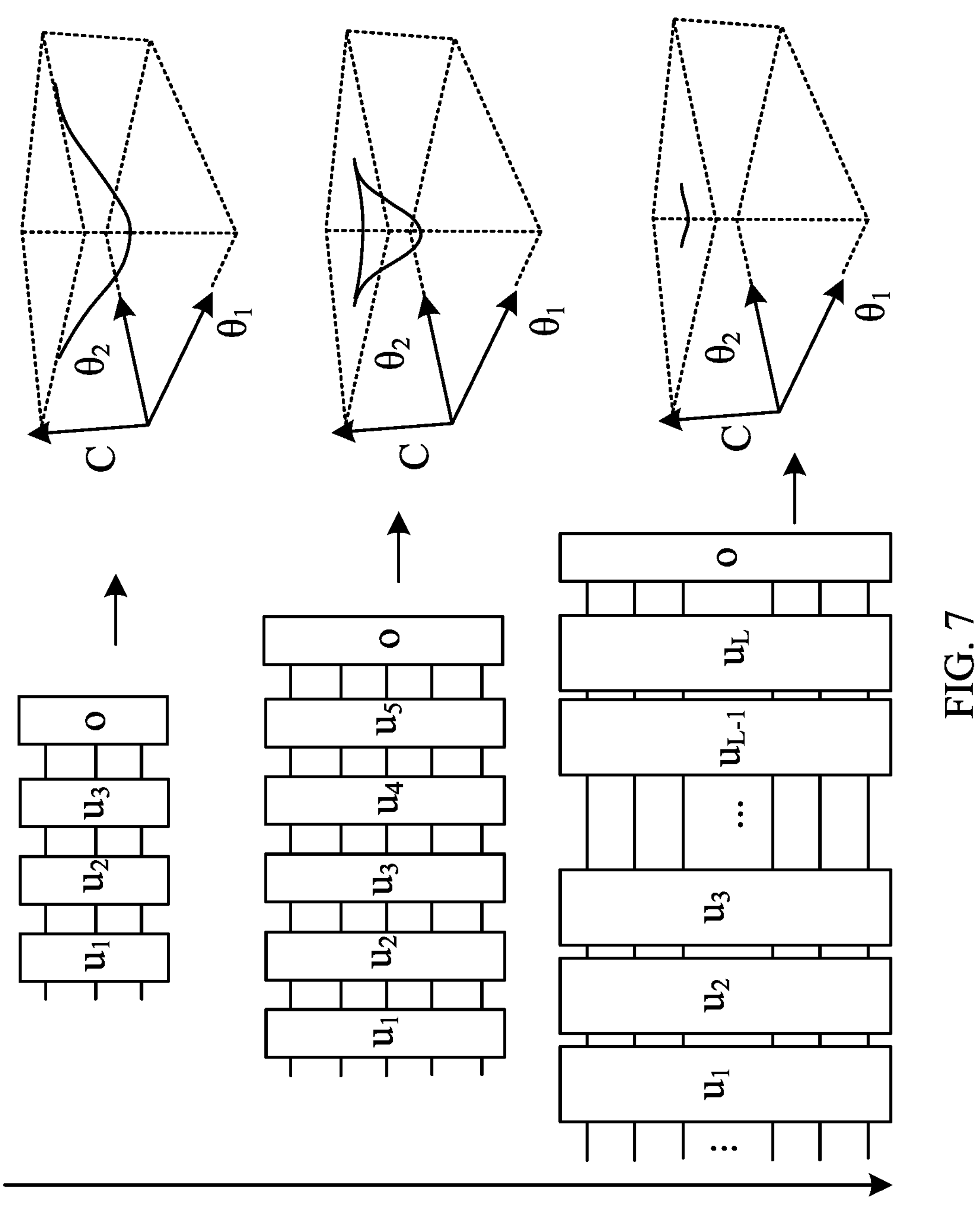
FIG. 7 is a schematic diagram of a flat plateau according to an exemplary embodiment of this application.

The method provided in this embodiment (1) proves through numerical simulation that it can converge faster than the single imaginary time evolution method when combined with imaginary time evolution, thereby achieving the goal of reducing circuit depth; (2) a measured quantity for $e^{-\Delta\tau H[l]}$ and imaginary time quantum control in each step are reduced by using the properties of diagonal matrices and Z measurements; (3) the non-variational design idea provides a better convergence path, while the classical variational method may encounter convergence difficulties, especially a flat plateau problem that may occur as the circuit deepens. FIG. 7 illustrates a schematic diagram of a flat plateau according to an exemplary embodiment of this application. As shown in FIG. 7, as the circuit depth 710 increases, the flat plateau problem is more obvious.

The method for fabricating a quantum circuit according to the embodiment of this application includes at least the following beneficial effects:

1. Reduce Measured Quantities During Circuit Update

Under a quantum unitary approximation policy, the measured quantities are five observations $\sigma_\mu\sigma_\nu$, $H_p\sigma_\mu$, $$H_p^2\sigma_\mu,$$

$H_p$, and $$H_p^2.$$

Symbols $N_p$ and $N_\mu$ are used to represent the measured quantities of $\sigma_\mu$ and $H_p$, simplification of the observations is not assumed, and the measured quantities of the five observations may be expressed as $N_p$, $$N_p^2, N_\mu^2, N_p^2N_\mu,$$

and $N_pN_\mu$. In a case that the total number of steps is $S_{QITE}$, the total observation may be expressed as:

$$S_{QITE}(N_p + N_p^2 + N_\mu^2 + N_p^2N_\mu + N_pN_\mu)$$

With the assistance of diagonal control, the measured quantities are transformed into two different modules: one involves the original five unitary approximation policy observations, and the other involves $\sigma_\mu\sigma_\nu$, $H_d\sigma_\mu$, and $\sigma_\mu$ (for unitary approximation) and $H_p$, $H_d$, and $H_d$ $H_p$ (for control). The measured quantities of the six observations may be expressed as $$N_\mu^2,$$

$N_\mu$, $N_dN_\mu$, $N_p$, $N_d$, $N_dN_p$, and $N_pN_d$. Therefore, in the case of steps $S_{QCITE}$ and $S_{QC}$, the total observation may be expressed as:

$$S_{QC}(N_dN_p + N_pN_d + N_p + N_d + N_dN_\mu + N_\mu + N_\mu^2) + S_{QCITE}(N_p + N_\mu^2 + N_p^2 + N_p^2N_\mu + N_pN_\mu)$$

where $N_d$ is not additional measured under the Z measurement, the measured quantities of $N_dN_p$ and $N_pN_d$ are equal, $N_p$ and $N_\mu$ are included in the measurements of $N_pN_d$ and $$N_\mu^2.$$

Therefore, a final simplified formula is obtained as follows:

$$S_{QC}(2N_dN_p + N_\mu^2) + S_{QCITE}(N_p + N_p^2 + N_\mu^2 + N_p^2N_\mu + N_pN_\mu) + O(N_p + N_\mu)$$

Comparisons of the total convergence quantities of the two methods may be expressed as:

$$\frac{S_{QC}(2N_dN_p + N_\mu^2) + S_{QCITE}(N_p + N_p^2 + N_\mu^2 + N_p^2N_\mu + N_pN_\mu)}{S_{QITE}(N_p + N_p^2 + N_\mu^2 + N_p^2N_\mu + N_pN_\mu)} \cong O\left(\frac{S_{QCITE}}{S_{QITE}}\right)$$

Therefore, the overall reduction in the measured quantities is approximately proportional to a quantum unitary approximation convergence step reduced by the control method.

2. Reduce Total Steps Required for Convergence

Figure 8:
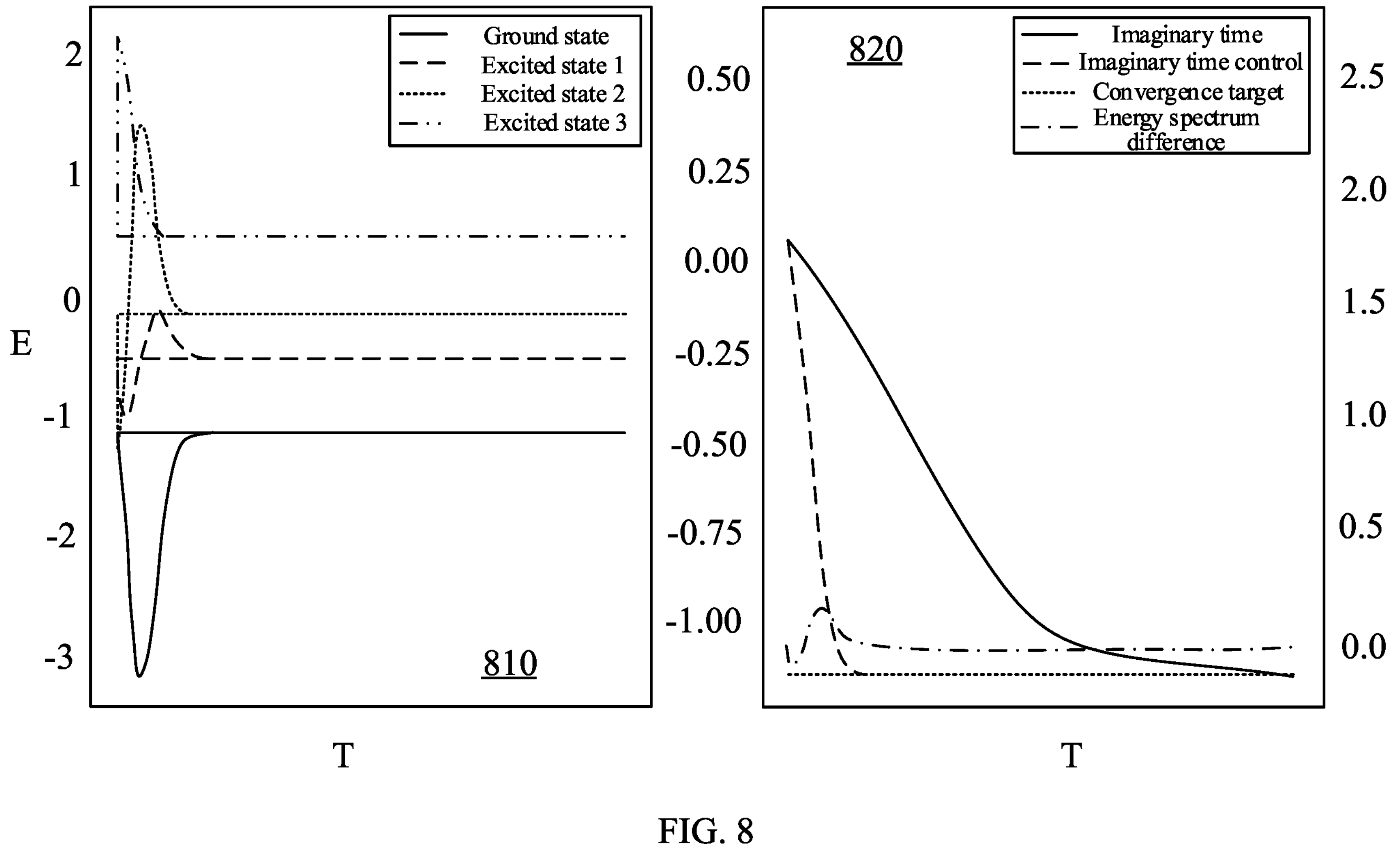
FIG. 8 is a diagram of imaginary time control energy level changes according to an embodiment of this application.

The quantum imaginary time control can effectively reduce a convergence step size in experimental testing. Because the quantum imaginary time control adjusts the energy difference of the original system, the imaginary time evolution can converge to the ground state faster. As shown in FIG. 8, the change of energy spectrum of hydrogen molecules with imaginary time under the assistance of the imaginary time control is shown in energy level change line graphs 810 and 820. When the difference between the excited state energy and the ground state energy is larger, the convergence is faster.

Figure 9:
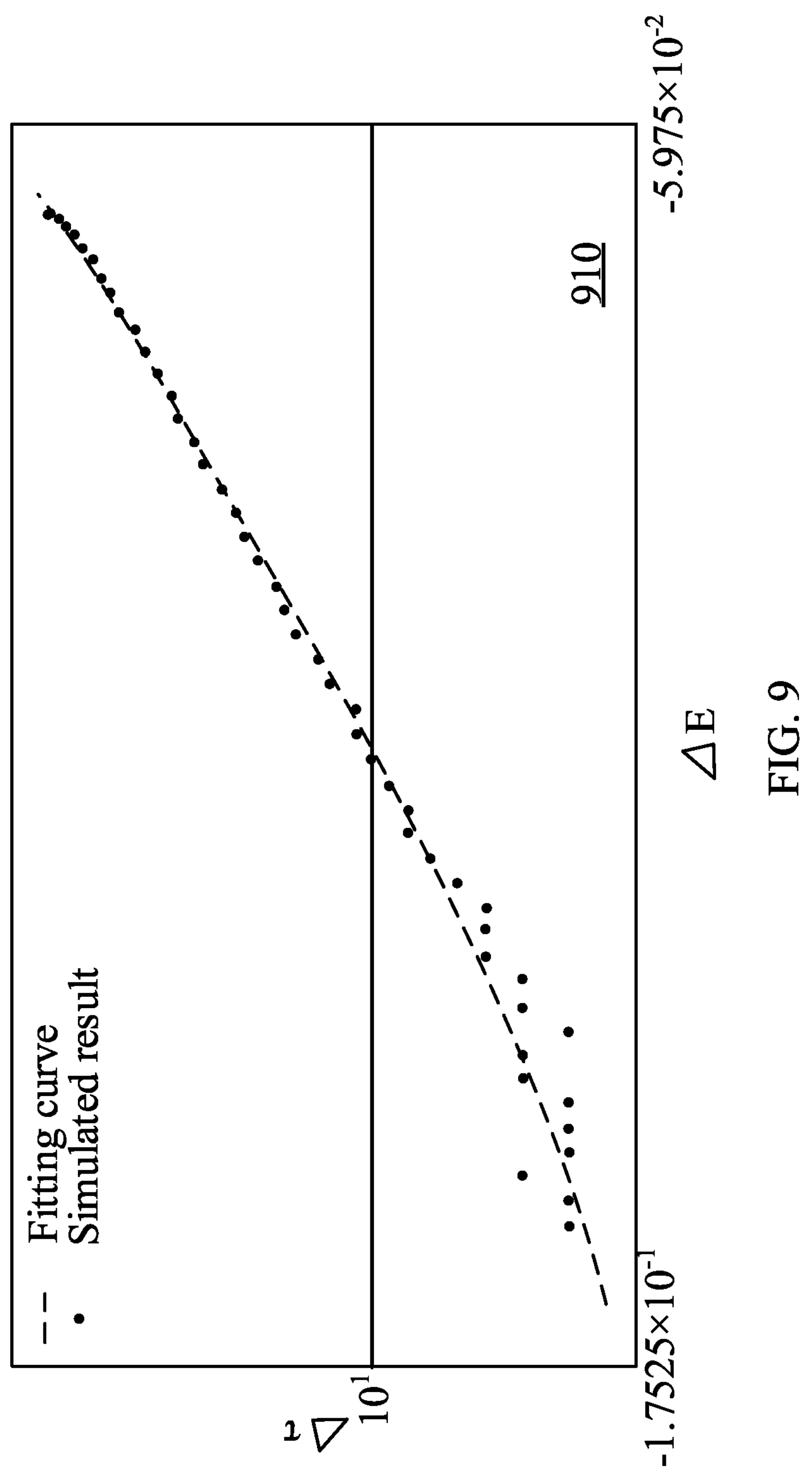
FIG. 9 is a schematic diagram of imaginary time control convergence steps over energy difference according to an embodiment of this application.

As shown in FIG. 9, due to the acceleration properties of quantum imaginary time control, the same precision is achieved with fewer steps. In line graph 910, a 3SAT system is used to demonstrate the variation of steps that the overall control algorithm can reduce with the energy system.

Figure 10:
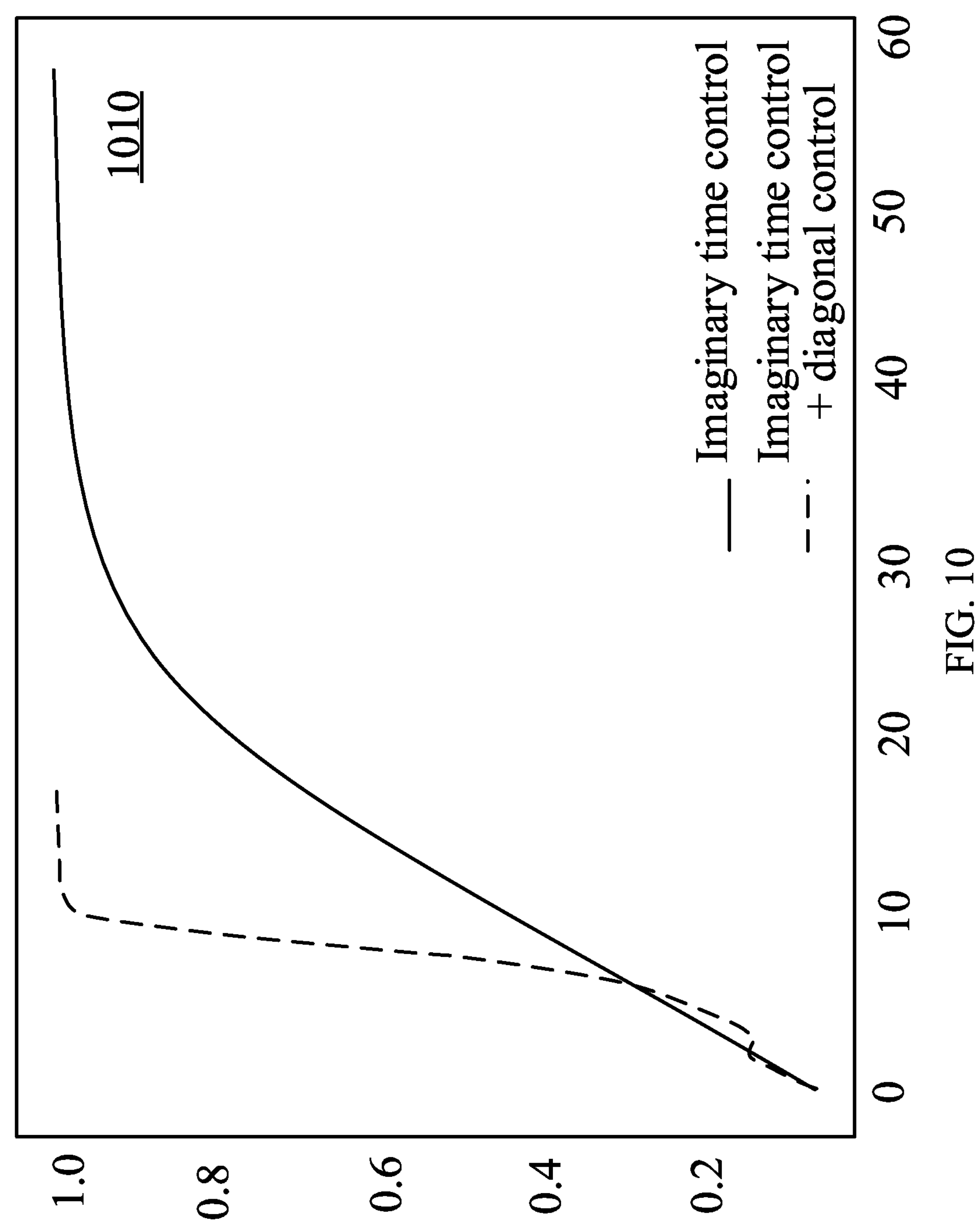
FIG. 10 is a diagram of convergence comparison lines of a diagonal control algorithm and an original imaginary time evolution algorithm according to an embodiment of this application.

FIG. 10 illustrates a convergence comparison line graph 1010 between a diagonal control algorithm and an original imaginary time evolution algorithm. Obviously, the convergence speed of the diagonal control algorithm+the imaginary time evolution algorithm is faster than that of the original imaginary time evolution algorithm.

The acceleration properties of quantum imaginary time control under this architecture may still be reflected, and the convergence circuit is reduced from the original 58-layer quantum imaginary time evolution circuit to an 8-layer quantum imaginary time evolution plus 8-layer diagonal control circuit. The overall measured quantity is about 8/58 of the original and the circuit depth is reduced to 16 layers. Convergence to target precision is achieved with less convergence time, shorter circuits, and fewer measurements.

3. Reduce Circuit Complexity Compared with the Original Imaginary Time Method

Figure 11:
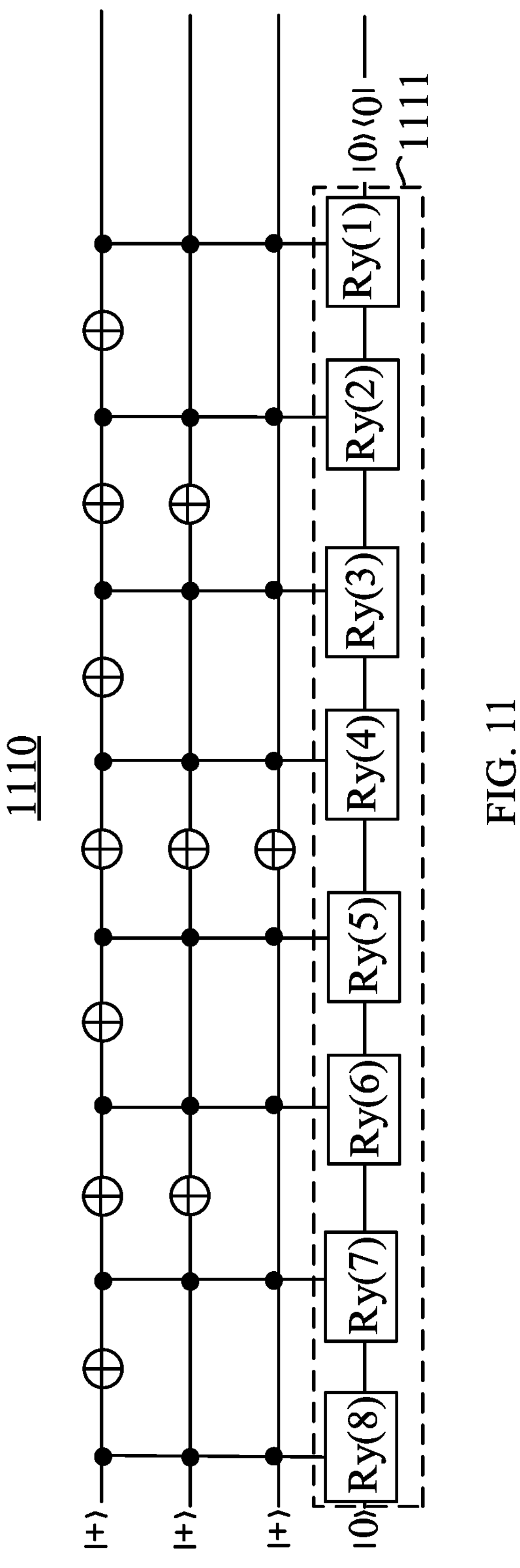
FIG. 11 is a schematic diagram of convergence comparison of a diagonal control algorithm and an original imaginary time evolution algorithm according to an embodiment of this application.

The diagonal circuit part in the foregoing architecture may also be implemented with a shorter circuit architecture after only one auxiliary bit is used, such as a 3-bit diagonal matrix circuit 1110 in FIG. 11. As shown in FIG. 11, the diagonal matrix circuit 1110 uses a post selection method combined with a control gate and an X gate to assign $$\cos\left(\frac{\pi}{2}\right)$$

in the matrix $$Ry = \begin{pmatrix} \cos\left(\frac{\pi}{2}\right) & -\sin\left(\frac{\pi}{2}\right) \\ \sin\left(\frac{\pi}{2}\right) & \cos\left(\frac{\pi}{2}\right) \end{pmatrix}$$

to specific elements on the diagonal matrix diag( . . . ), to obtain diag $$\left(1,\ 1,\ 1,\ \ldots,\ \cos\left(\frac{\pi}{2}\right)\right).$$

The auxiliary bit diagonal matrix circuit 1110 has 8 diagonal elements, 8 Ry gates 1111 are needed for one-by-one adjustment, so as to implement non-unitary evolution.

In the embodiment of this application, the circuit is further reduced to a shorter fixed length according to the combination of selected identity matrices and Pauli Z matrices. For example, under the combination architecture of identity matrices and Pauli Z matrices, half of the diagonal elements are adjusted by a Pauli Z matrix, while the remaining half remains unchanged. For example, an IIZ combination matrix obtained by a combination of two identity matrices and one Pauli Z matrix only works on elements with the third bit of 1, namely, 4 items (001, 011, 101, 111), and the circuit may be simplified from the diagonal matrix circuit 1110 shown in FIG. 11 to the circuit 1210 shown in FIG. 12. In the circuit 1210 shown in FIG. 12, the Pauli Z matrix adjusts the diagonal elements with the third bit of 1, while the remaining diagonal elements are not affected.

Figure 12:
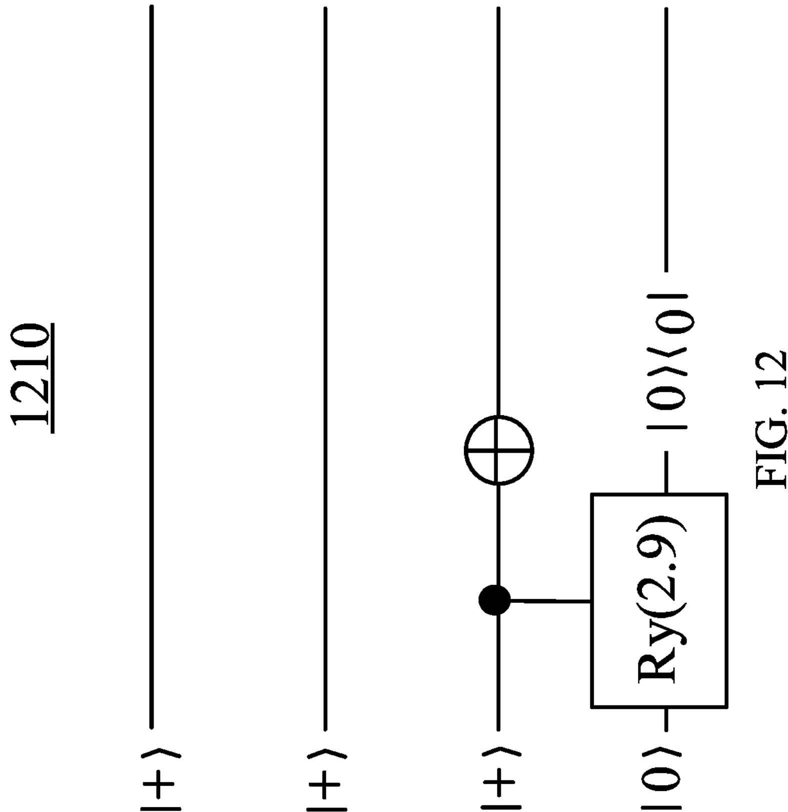
FIG. 12 is a schematic diagram of an auxiliary bit diagonal matrix circuit according to an embodiment of this application.
Figure 13:
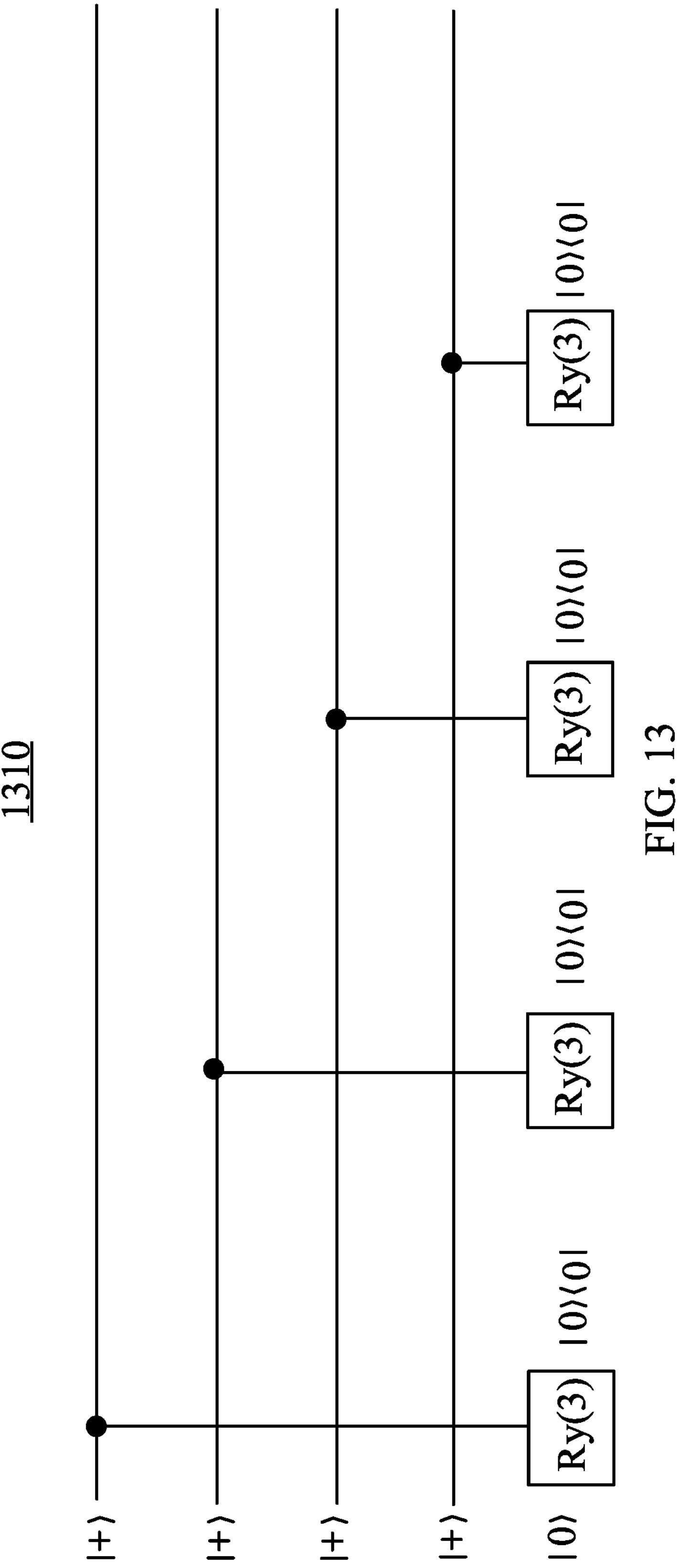
FIG. 13 is a schematic diagram of a single-step control circuit according to an embodiment of this application.

Moreover, since the control operators are interchangeable with each other, the continuous multi-step control circuit may be simplified into a single-step control circuit and implemented on a quantum computer with a shorter circuit architecture similar to that shown in FIG. 12. The circuit 1310 shown in FIG. 13 shows a continuous two-layer circuit simplified to a single-layer control circuit 1310 using switching. The two-layer circuit is implemented as:

$$\left(e^{-c_0 IIIZ} e^{-c_1 IIZI} e^{-c_2 IZII} e^{-c_3 ZIII}\right)\left(e^{-c_4 IIIZ} e^{-c_5 IIZI} e^{-c_6 IZII} e^{-c_7 ZIII}\right),$$

and the simplified single-layer control circuit 1310 has the following logic:

$$\left(e^{-c_0 IIIZ} e^{-c_4 IIIZ}\right)\left(e^{-c_1 IIZI} e^{-c_5 IIZI}\right)\left(e^{-c_2 IZII} e^{-c_6 IZII}\right)\left(e^{-c_3 ZIII} e^{-c_7 ZIII}\right) = e^{-c_0' IIIZ} e^{-c_1' IIZI} e^{-c_2' IZII} e^{-c_3' ZIII}$$

Figure 14:
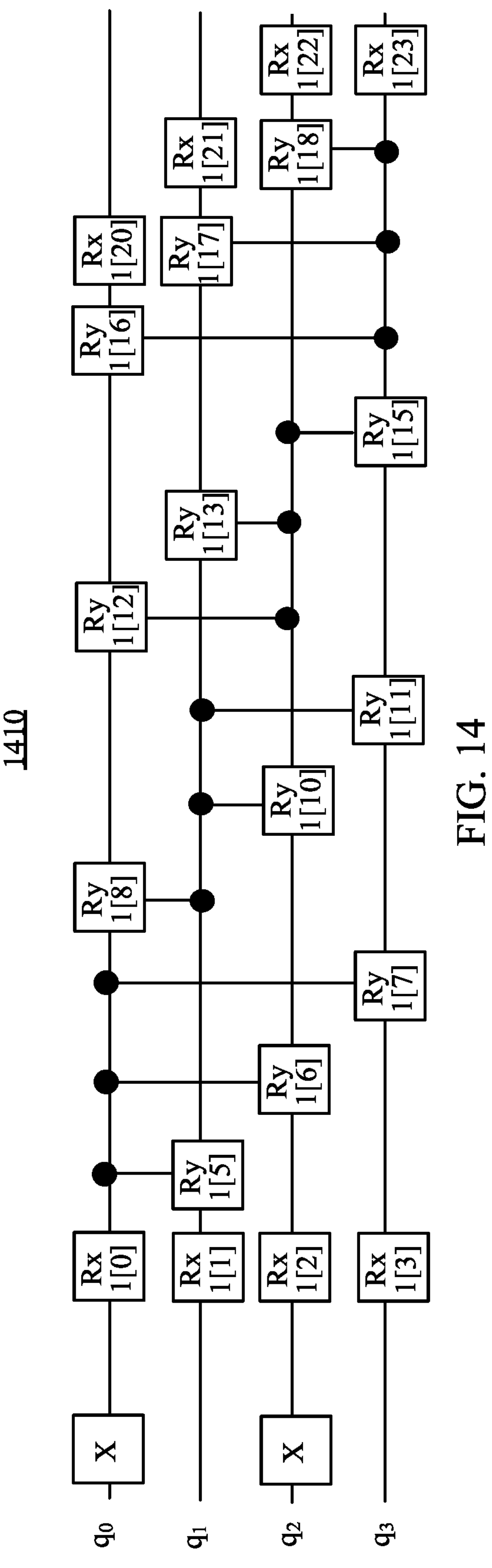
FIG. 14 is a schematic diagram of a variational circuit according to an embodiment of this application.

In the quantum unitary approximation circuit, the circuit depth may be shortened by using a variational circuit, such as a variational circuit 1410 shown in FIG. 14. Compared with the original unitary approximation circuit method, although the selection of the variational circuit greatly affects the convergence difficulty, circuit length, and precision, the variational circuit combined with the diagonal control circuit may reduce circuit design requirements and retain its structural advantages as a short circuit. In some embodiments, the variational circuit 1410 is first obtained, the variational circuit 1410 including circuit parameters to be trained, such as, a quantum gate parameter in the variational circuit 1410; a preset loss function is obtained, the preset loss function being used for defining an expected value of the circuit parameter of the variational circuit; a loss value of the variational circuit 1410 is determined based on a quantum operation result of the variational circuit 1410 and the preset loss function; and the variational circuit 1410 is trained based on the loss value to obtain the second quantum circuit, e.g., by reducing the loss value of preset loss function until it satisfies a predefined threshold.

It is worth noting that in some embodiments, real-time control may also be implemented by using similar methods, and due to its unitary evolution, there are more intuitive and non-approximate circuit fabrication methods in circuit selection.

Figure 15:
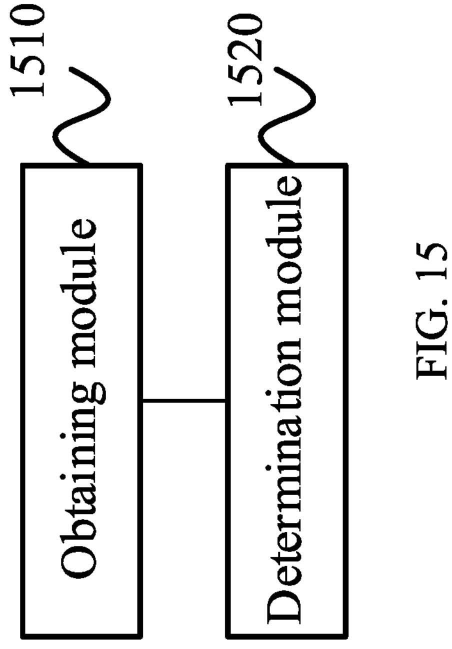
FIG. 15 is a structural block diagram of an apparatus for fabricating a quantum circuit according to an embodiment of this application.

FIG. 15 is a structural block diagram of an apparatus for fabricating a quantum circuit according to an exemplary embodiment of this application. As shown in FIG. 15, the apparatus include:

- an obtaining module 1510, configured to obtain a combination of identity matrices and Pauli Z matrices as a diagonal matrix basis; and
- a determination module 1520, configured to determine a dynamical evolution relationship of imaginary time diagonal control based on a dynamical evolution relationship of quantum imaginary time control and the diagonal matrix basis, where

- the determination module 1520 is further configured to determine a first quantum circuit of imaginary time diagonal control based on the dynamical evolution relationship of imaginary time diagonal control;
- the determination module 1520 is further configured to determine a second quantum circuit based on a variational quantum approximation algorithm; and
- the determination module 1520 is further configured to use a cyclic alternating circuit of the first quantum circuit and the second quantum circuit as a fabricated quantum circuit.

Figure 16:
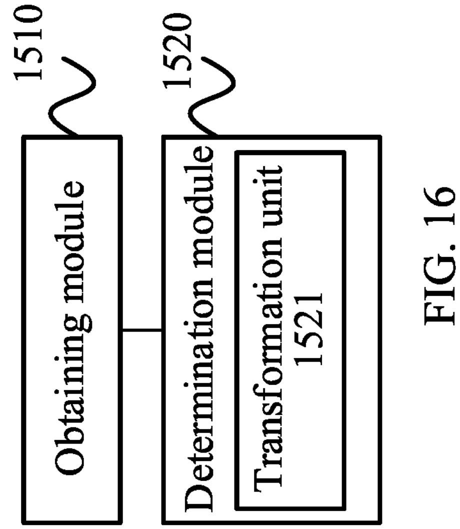
FIG. 16 is a structural block diagram of an apparatus for fabricating a quantum circuit according to another embodiment of this application.

In an exemplary embodiment, as shown in FIG. 16, the determination module 1520 includes:

- a transformation unit 1521, configured to perform unitary transformation on the dynamical evolution relationship of imaginary time diagonal control through an imaginary time evolution unitary approximation apparatus to obtain the first quantum circuit.

In an exemplary embodiment, the transformation unit 1521 is further configured to transform the dynamical evolution relationship of imaginary time diagonal control into a candidate quantum circuit; and perform unitary transformation on the candidate quantum circuit through the quantum imaginary time evolution unitary approximation apparatus to obtain the first quantum circuit of imaginary time diagonal control.

In an exemplary embodiment, the dynamical evolution relationship of imaginary time diagonal control is as follows:

$$\frac{d|\psi(\tau)\rangle}{d\tau} = -(\beta_d(\tau)H_d - E)|\psi(\tau)\rangle$$

- where $\tau$ represents imaginary time, $|\psi(\tau)\rangle$ represents an imaginary time eigenstate, $H_d$ is an evolution operator determined based on the diagonal matrix basis, $\beta_d(\tau)$ represents a real coefficient that changes with time, and E represents eigen-energy.

In an exemplary embodiment, the real coefficient is determined based on a first-order partial derivative of time required by a Lyapunov function.

In an exemplary embodiment, the Lyapunov function requires the first-order partial derivative of time as follows:

$$\dot{V}(\psi(\tau)) = -\langle \dot{\psi}(\tau)|(H_p - E_0)\beta_d(\tau)(H_d - E)|\psi(t)\rangle - \langle \psi(t)|\beta_d(\tau)H_d - E)(H_p - E_0)\rangle \dot{\psi}(\tau)\rangle$$

where $E_0$ is an $H_p$ minimum eigenvalue.

In an exemplary embodiment, the real coefficient is as follow:

$$\beta_d(\tau) = (\langle \psi(\tau)||\{H_d, H_p\}||\psi(\tau)\rangle - 2\langle H_d\rangle\langle H_p\rangle)$$

In an exemplary embodiment, the determination module 1520 is further configured to alternately set the first quantum circuit and the second quantum circuit with a preset imaginary time step as a cycle to obtain the quantum circuit.

In summary, in the apparatus provided in this embodiment, a quantum diagonal control method suitable for a quantum imaginary time evolution process is used to reduce a measured quantity and accelerate quantum imaginary time evolution. A circuit structure of alternating cycles of a variational circuit and a diagonal control circuit has a shorter circuit architecture to implement the same evolution, and also reduces a quantity of parameters required by a variational circuit and measurement requirements.

It is to be noted that, the apparatus for fabricating a quantum circuit provided in the foregoing embodiment is illustrated with an example of division of the foregoing function modules. In practical application, the foregoing functions may be allocated to and completed by different function modules according to requirements, that is, the internal structure of the apparatus is divided into different function modules, so as to complete all or part of the functions described above. In addition, the apparatus for fabricating a quantum circuit provided in the foregoing embodiment and the embodiment of the method for fabricating a quantum circuit fall within a same conception. For details of a specific implementation process, refer to the method embodiment. Details are not described herein again.

Figure 17:
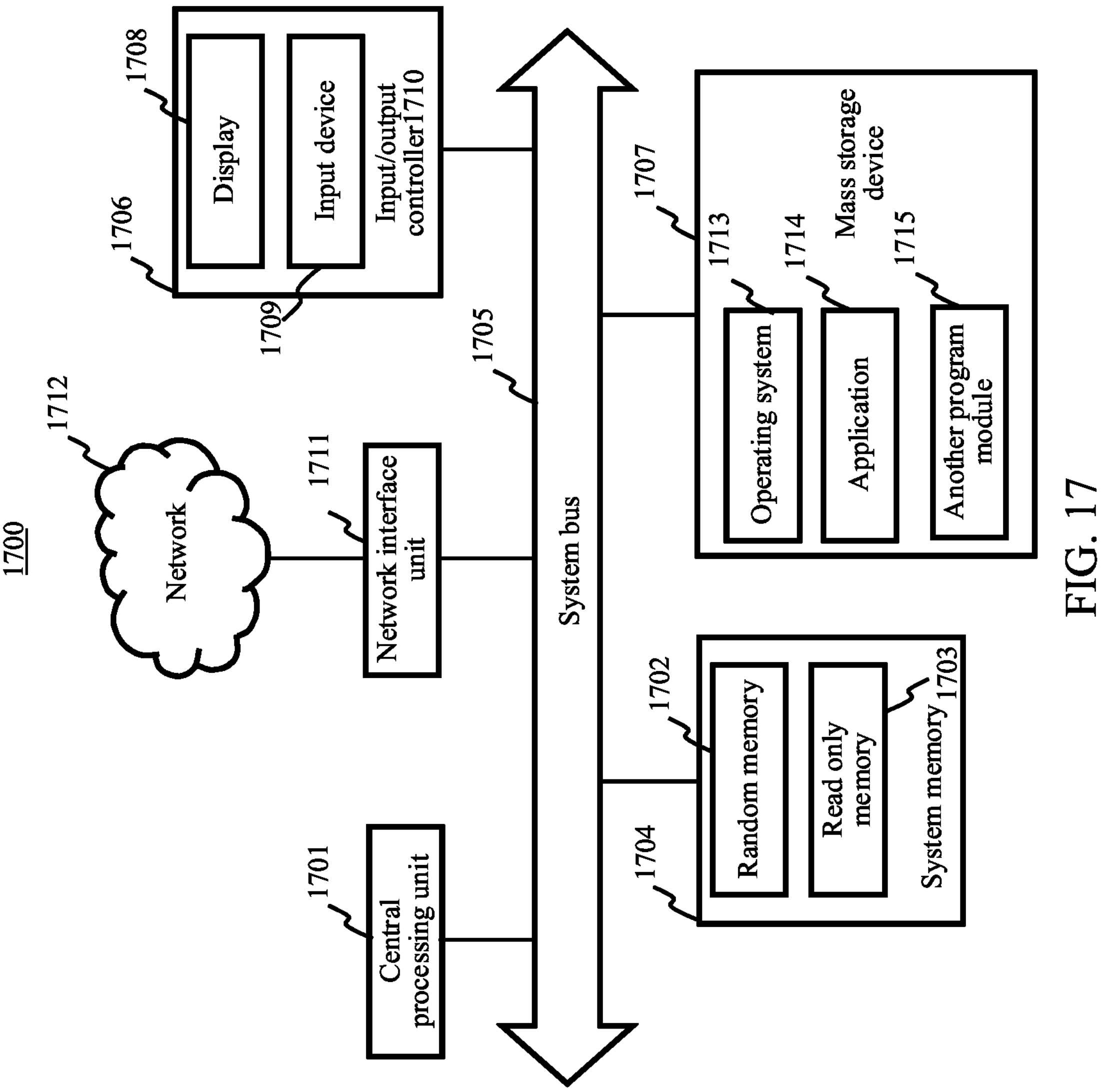
FIG. 17 is a structural block diagram of a computer device according to an embodiment of this application.

FIG. 17 is a structural block diagram of a computer device 1700 according to an embodiment of this application. The computer device 1700 may be a classical computer. The computer device may be used to perform the method for fabricating a quantum circuit provided in the foregoing embodiment.

The computer device 1700 includes a central processing unit (such as CPU (Central Processing Unit), a GPU (Graphics Processing Unit), and an FPGA (Field Programmable Gate Array)) 1701, a system memory 1704 including a random-access memory (RAM) 1702 and a read-only memory (ROM) 1703, and a system bus 1705 connecting the system memory 1704 and the central processing unit 1701. The computer device 1700 further includes a basic input output (I/O) system 1706 assisting in transmitting information between components in a server, and a mass storage device 1707 configured to store an operating system 1713, an application 1714, and another program module 1715.

In some embodiments, the basic I/O system 1706 includes a display 1708 configured to display information and an input device 1709, such as a mouse or a keyboard, configured to input information for a user. The display 1708 and the input device 1709 are both connected to the central processing unit 1701 by using an input output controller 1710 connected to the system bus 1705. The basic I/O system 1706 may further include the input and output controller 1710 for receiving and processing inputs from a plurality of other devices such as a keyboard, a mouse, and an electronic stylus. Similarly, the input output controller 1710 further provides an output to a display screen, a printer, or another type of output device.

In some embodiments, the mass storage device 1707 is connected to the central processing unit 1701 by using a mass storage controller (not shown) connected to the system bus 1705. The mass storage device 1707 and a computer-readable medium associated with the mass storage device provide non-volatile storage to the computer device 1700. That is, the mass storage device 1707 may include a computer-readable medium (not shown) such as a hard disk or a CD-ROM (Compact Disc Read-Only Memory) drive.

According to the embodiments of this application, the computer device 1700 may further be connected, through a network such as the Internet, to a remote computer on the network and run. That is, the computer device 1700 may be connected to a network 1712 by using a network interface unit 1711 connected to the system bus 1705, or may be connected to another type of network or a remote computer system (not shown) by using a network interface unit 1711.

A person skilled in the art may understand that the structure shown in FIG. 17 constitutes no limitation on the computer device 1700, and the computer device may include more or fewer components than those shown in the figure, or some components may be combined, or a different component deployment may be used.

In an exemplary embodiment, a computer-readable storage medium is further provided, the storage medium storing at least one instruction, at least one program, and a code set or an instruction set, the at least one instruction, the at least one program, the code set or the instruction set being executed by a processor to implement the foregoing method for fabricating a quantum circuit.

In an exemplary embodiment, a computer program product or a computer program is further provided, the computer program product or the computer program including computer instructions, and the computer instructions being stored in a computer-readable storage medium. A processor of a computer device reads the computer instructions from the computer-readable storage medium, the processor performs the computer instructions, and the computer device is enabled to perform the foregoing method for fabricating a quantum circuit.

In this application, the term "module" or "unit" in this application refers to a computer program or part of the computer program that has a predefined function and works together with other related parts to achieve a predefined goal and may be all or partially implemented by using software, hardware (e.g., processing circuitry and/or memory configured to perform the predefined functions), or a combination thereof. Each module or unit can be implemented using one or more processors (or processors and memory). Likewise, a processor (or processors and memory) can be used to implement one or more modules or units. Moreover, each module or unit can be part of an overall module or unit that includes the functionalities of the module or unit.

What is claimed is:

1. A method for obtaining a quantum circuit, performed by a computer device, the method comprising:

obtaining a combination of identity matrices and Pauli Z matrices as a diagonal matrix basis;

determining a dynamical evolution relationship of imaginary time diagonal control based on a dynamical evolution relationship of quantum imaginary time control and the diagonal matrix basis;

determining a first quantum circuit of imaginary time diagonal control based on the dynamical evolution relationship of imaginary time diagonal control;

determining a second quantum circuit based on a variational quantum approximation algorithm; and obtaining a quantum circuit using a cyclic alternating circuit of the first quantum circuit and the second quantum circuit.

2. The method according to claim 1, wherein the determining a first quantum circuit of imaginary time diagonal control based on the dynamical evolution relationship of imaginary time diagonal control comprises:

performing unitary transformation on the dynamical evolution relationship of imaginary time diagonal control through an imaginary time evolution unitary approximation method to obtain the first quantum circuit of imaginary time diagonal control.

3. The method according to claim 2, wherein the performing unitary transformation on the dynamical evolution relationship of imaginary time diagonal control through an imaginary time evolution unitary approximation method to obtain the first quantum circuit of imaginary time diagonal control comprises:

transforming the dynamical evolution relationship of imaginary time diagonal control into a candidate quantum circuit; and performing unitary transformation on the candidate quantum circuit through the imaginary time evolution unitary approximation method to obtain the first quantum circuit.

4. The method according to claim 1, wherein the determining a second quantum circuit based on a variational quantum approximation algorithm comprises:

obtaining a candidate quantum circuit;

obtaining a preset loss function, the preset loss function defining an expected value of a circuit parameter of the candidate quantum circuit;

determining a loss value of the candidate quantum circuit based on a quantum operation result of the candidate quantum circuit and the preset loss function; and training the candidate quantum circuit based on the loss value to obtain the second quantum circuit.

5. The method according to claim 4, wherein the candidate quantum circuit is a variational circuit and the circuit parameter is a quantum gate parameter of the variational circuit.

6. The method according to claim 4, wherein the training the candidate quantum circuit based on the loss value to obtain the second quantum circuit comprises updating the circuit parameter to reduce the loss value of preset loss function until it satisfies a predefined threshold.

7. The method according to claim 1, wherein the obtaining a quantum circuit using a cyclic alternating circuit of the first quantum circuit and the second quantum circuit comprises:

alternately setting the first quantum circuit and the second quantum circuit with a preset imaginary time step as a cycle to obtain the quantum circuit.

8. A computer device, the computer device comprising a processor and a memory, the memory storing at least one instruction, and the at least one instruction, when executed by the processor, causing the computer device to implement a method for obtaining a quantum circuit including:

obtaining a combination of identity matrices and Pauli Z matrices as a diagonal matrix basis;

determining a dynamical evolution relationship of imaginary time diagonal control based on a dynamical evolution relationship of quantum imaginary time control and the diagonal matrix basis;

determining a first quantum circuit of imaginary time diagonal control based on the dynamical evolution relationship of imaginary time diagonal control;

determining a second quantum circuit based on a variational quantum approximation algorithm; and obtaining a quantum circuit using a cyclic alternating circuit of the first quantum circuit and the second quantum circuit.

9. The computer device according to claim 8, wherein the determining a first quantum circuit of imaginary time diagonal control based on the dynamical evolution relationship of imaginary time diagonal control comprises:

performing unitary transformation on the dynamical evolution relationship of imaginary time diagonal control through an imaginary time evolution unitary approximation method to obtain the first quantum circuit of imaginary time diagonal control.

10. The computer device according to claim 9, wherein the performing unitary transformation on the dynamical evolution relationship of imaginary time diagonal control through an imaginary time evolution unitary approximation method to obtain the first quantum circuit of imaginary time diagonal control comprises:

transforming the dynamical evolution relationship of imaginary time diagonal control into a candidate quantum circuit; and performing unitary transformation on the candidate quantum circuit through the imaginary time evolution unitary approximation method to obtain the first quantum circuit.

11. The computer device according to claim 8, wherein the determining a second quantum circuit based on a variational quantum approximation algorithm comprises:

obtaining a candidate quantum circuit;

obtaining a preset loss function, the preset loss function defining an expected value of a circuit parameter of the candidate quantum circuit;

determining a loss value of the candidate quantum circuit based on a quantum operation result of the candidate quantum circuit and the preset loss function; and training the candidate quantum circuit based on the loss value to obtain the second quantum circuit.

12. The computer device according to claim 11, wherein the candidate quantum circuit is a variational circuit and the circuit parameter is a quantum gate parameter of the variational circuit.

13. The computer device according to claim 11, wherein the training the candidate quantum circuit based on the loss value to obtain the second quantum circuit comprises updating the circuit parameter to reduce the loss value of preset loss function until it satisfies a predefined threshold.

14. The computer device according to claim 8, wherein the obtaining a quantum circuit using a cyclic alternating circuit of the first quantum circuit and the second quantum circuit comprises:

alternately setting the first quantum circuit and the second quantum circuit with a preset imaginary time step as a cycle to obtain the quantum circuit.

15. A non-transitory computer-readable storage medium storing at least one instruction, and the at least one instruction, when executed by a processor of a computer device, causing the computer device to implement a method for obtaining a quantum circuit including:

obtaining a combination of identity matrices and Pauli Z matrices as a diagonal matrix basis;

determining a dynamical evolution relationship of imaginary time diagonal control based on a dynamical evolution relationship of quantum imaginary time control and the diagonal matrix basis;

determining a first quantum circuit of imaginary time diagonal control based on the dynamical evolution relationship of imaginary time diagonal control;

determining a second quantum circuit based on a variational quantum approximation algorithm; and obtaining a quantum circuit using a cyclic alternating circuit of the first quantum circuit and the second quantum circuit.

16. The non-transitory computer-readable storage medium according to claim 15, wherein the determining a first quantum circuit of imaginary time diagonal control based on the dynamical evolution relationship of imaginary time diagonal control comprises:

performing unitary transformation on the dynamical evolution relationship of imaginary time diagonal control through an imaginary time evolution unitary approximation method to obtain the first quantum circuit of imaginary time diagonal control.

17. The non-transitory computer-readable storage medium according to claim 16, wherein the performing unitary transformation on the dynamical evolution relationship of imaginary time diagonal control through an imaginary time evolution unitary approximation method to obtain the first quantum circuit of imaginary time diagonal control comprises:

transforming the dynamical evolution relationship of imaginary time diagonal control into a candidate quantum circuit; and performing unitary transformation on the candidate quantum circuit through the imaginary time evolution unitary approximation method to obtain the first quantum circuit.

18. The non-transitory computer-readable storage medium according to claim 15, wherein the determining a second quantum circuit based on a variational quantum approximation algorithm comprises:

obtaining a candidate quantum circuit;

obtaining a preset loss function, the preset loss function defining an expected value of a circuit parameter of the candidate quantum circuit;

determining a loss value of the candidate quantum circuit based on a quantum operation result of the candidate quantum circuit and the preset loss function; and training the candidate quantum circuit based on the loss value to obtain the second quantum circuit.

19. The non-transitory computer-readable storage medium according to claim 18, wherein the training the candidate quantum circuit based on the loss value to obtain the second quantum circuit comprises updating the circuit parameter to reduce the loss value of preset loss function until it satisfies a predefined threshold.

20. The non-transitory computer-readable storage medium according to claim 15, wherein the obtaining a quantum circuit using a cyclic alternating circuit of the first quantum circuit and the second quantum circuit comprises:

alternately setting the first quantum circuit and the second quantum circuit with a preset imaginary time step as a cycle to obtain the quantum circuit.

* * * * *